(12) United States Patent
Kawaguchi et al.

(10) Patent No.: US 11,986,730 B2
(45) Date of Patent: May 21, 2024

(54) NON-TRANSITORY COMPUTER READABLE MEDIUM, INFORMATION PROCESSING METHOD, INFORMATION PROCESSING DEVICE, AND INFORMATION PROCESSING SYSTEM FOR OMITTING PORTIONS OF A COMPUTER GAME BASED ON PLAYER OPERATIONS

(71) Applicant: CYGAMES, INC., Tokyo (JP)

(72) Inventors: Ryuhei Kawaguchi, Tokyo (JP); Yuya Kato, Tokyo (JP); Kazuhiro Oura, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/656,569

(22) Filed: Mar. 25, 2022

(65) Prior Publication Data
US 2022/0212106 A1   Jul. 7, 2022

Related U.S. Application Data

(63) Continuation of application No. PCT/JP2020/032854, filed on Aug. 31, 2020.

(30) Foreign Application Priority Data
Sep. 27, 2019   (JP) .................... 2019-176526

(51) Int. Cl.
A63F 13/537   (2014.01)
(52) U.S. Cl.
CPC .................... A63F 13/537 (2014.09)
(58) Field of Classification Search
CPC ......... A63F 13/537; A63F 13/45; A63F 13/47
See application file for complete search history.

(56) References Cited

U.S. PATENT DOCUMENTS 8,821,260 B1 *  9/2014  DeSanti ................. A63F 13/69
                                                                463/43
9,666,029 B1 *  5/2017  Yu .......................... A63F 13/35
(Continued)

FOREIGN PATENT DOCUMENTS

JP   2017185268 A   10/2017

OTHER PUBLICATIONS

[Smartphone] Yu Yu Hakusho 100% Honki (Maji) Battle: Repeat Skip Function [Strategy].[online], Takato Games, Jan. 20, 2019 [retrived on Aug. 17, 2020] (10 pages).
2.3.8 Version Update, with Pet Spirit Highland/materials Dungeon Instant Clear, Skill Push Implementation, etc.? [online], Endless Frontier Strategy Blog, Dec. 4, 2018 [retrived on Aug. 17, 2020] (6 pages).
[YuYu Hakusho: Maji Battle] Maji Battle godlike update!! Skip function and repetitive battle function have been implemented!—YouTube, URL, https://www.youtube.com/watch?v=t10yBeZCbc8, Jan. 22, 2019[retrived on Dec. 23, 2020] (1 page).
(Continued)

*Primary Examiner* — Steve Rowland
(74) *Attorney, Agent, or Firm* — Osha Bergman Watanabe & Burton LLP

(57) ABSTRACT

Provided is an information processing program for causing a computer to function as: a game executing unit that executes a predetermined game on the basis of an operation of a player; a skip-game executing unit that executes the game while omitting at least a portion of functions of the game; a reward assigning unit that assigns a predetermined reward when the game is cleared; and a display control unit that displays a plurality of the games of each of which at least a portion of the functions can be omitted, wherein the skip-game executing unit collectively executes games selected from among the plurality of displayed games.

8 Claims, 42 Drawing Sheets

(56) References Cited

U.S. PATENT DOCUMENTS

| | | | | |
|---|---|---|---|---|
| 2013/0196744 A1* | 8/2013 | Earley | ............... | G07F 17/3255 |
| | | | | 463/25 |
| 2013/0288757 A1* | 10/2013 | Guthridge | ............... | A63F 13/67 |
| | | | | 463/2 |
| 2015/0306494 A1* | 10/2015 | Pieron | ............... | A63F 13/69 |
| | | | | 463/31 |
| 2015/0379817 A1* | 12/2015 | Masui | ............... | A63F 13/46 |
| | | | | 463/25 |
| 2016/0005077 A1* | 1/2016 | McDevitt | ............... | H04W 4/021 |
| | | | | 705/14.58 |
| 2016/0314654 A1* | 10/2016 | Lo | ............... | G07F 17/3251 |
| 2023/0125352 A1* | 4/2023 | Dorris, Jr. | ............... | G06Q 30/0239 |
| | | | | 705/14.36 |

OTHER PUBLICATIONS

Office Action issued in Japanese Application No. 2019-176526; dated Sep. 1, 2020 (4 pages).
Office Action issued in Japanese Application No. 2019-176526; dated Jan. 19, 2021 (3 pages).
International Search Report issued in International Application No. PCT/JP2020/032854, dated Sep. 29, 2020 (7 pages).
Written Opinion issued in International Application No. PCT/JP2020/032854; dated Sep. 29, 2020 (4 pages).

* cited by examiner

|  | WINNING | NOT WINNING |
|---|---|---|
| 1st TIME | 10% | 90% |
| 2nd TIME | 20% | 80% |
| 3rd TIME | 30% | 70% |
| 4th TIME | 40% | 60% |
| 5th TIME | 50% | 50% |
| 6th TIME | 60% | 40% |
| 7th TIME | 70% | 30% |
| 8th TIME | 80% | 20% |
| 9th TIME | 90% | 10% |
| 10th TIME | 100% | 0% |

FIG.9

NON-TRANSITORY COMPUTER READABLE MEDIUM, INFORMATION PROCESSING METHOD, INFORMATION PROCESSING DEVICE, AND INFORMATION PROCESSING SYSTEM FOR OMITTING PORTIONS OF A COMPUTER GAME BASED ON PLAYER OPERATIONS

CROSS REFERENCE TO RELATED APPLICATIONS

This application is a continuation application of International Application No. PCT/JP2020/032854, filed on Aug. 31, 2020, which claims priority to Japanese Patent Application No. 2019-176526, filed on Sep. 27, 2019, the entire contents of which are incorporated by reference herein.

BACKGROUND ART

Technical Field

The present invention relates to an information processing program, an information processing method, an information processing device, and an information processing system.

As shown in Patent Literature 1, for example, an information processing system in which a game is skipped on the basis of a predetermined operation of a player and is treated as being cleared has been conventionally proposed.

CITATION LIST

Patent Literature

Patent Literature 1: JP 2017-185268 A

SUMMARY OF INVENTION

Technical Problem

In information processing systems, there are cases in which, for individual games, different rewards that can be assigned when the games are cleared are set. In these cases, a player needs to select a game from which a desired reward could be assigned and to execute the game. Thus, there is a problem in that time and effort are required until the player obtains the desired reward.

An object of the present invention is to provide an information processing program, an information processing method, an information processing device, and an information processing system with which time and effort of a player can be saved.

Solution to Problem

In order to solve the above-described problems, the present invention provides an information processing program for causing a computer to function as: a game executing unit that executes a predetermined game on the basis of an operation of a player; a skip-game executing unit that executes the game while omitting at least a portion of functions of the game; a reward assigning unit that assigns a predetermined reward when the game is cleared; and a display control unit that displays a plurality of the games of each of which at least a portion of the functions can be omitted, wherein the skip-game executing unit collectively executes games selected from among the plurality of displayed games.

The display control unit may display a plurality of the games from which selected rewards can be obtained and of each of which at least a portion of the functions can be omitted.

Stamina required to execute the game may be set for the game, and the skip-game executing unit may collectively execute the games selected from among the plurality of displayed games, within the range of stamina owned by the player.

In the case where the selected games are not all collectively executed due to a lack of the stamina owned by the player, the display control unit may display the game that has been executed and the game that has not been executed in an identifiable manner.

In order to solve the above-described problems, the present invention provides an information processing method including: a step for executing a predetermined game on the basis of an operation of a player; a step for executing the game while omitting at least a portion of functions of the game; a step for assigning a predetermined reward when the game is cleared; and a step for displaying a plurality of the games of each of which at least a portion of the functions can be omitted, wherein, in the step for executing the game while omitting at least a portion of the functions of the game, games selected from among the plurality of displayed games are collectively executed.

In order to solve the above-described problems, the present invention provides an information processing device including: a game executing unit that executes a predetermined game on the basis of an operation of a player; a skip-game executing unit that executes the game while omitting at least a portion of functions of the game; a reward assigning unit that assigns a predetermined reward when the game is cleared; and a display control unit that displays a plurality of the games of each of which at least a portion of the functions can be omitted, wherein the skip-game executing unit collectively executes games selected from among the plurality of displayed games.

In order to solve the above-described problems, the present invention provides an information processing system including: a game executing unit that executes a predetermined game on the basis of an operation of a player; a skip-game executing unit that executes the game while omitting at least a portion of functions of the game; a reward assigning unit that assigns a predetermined reward when the game is cleared; and a display control unit that displays a plurality of the games of each of which at least a portion of the functions can be omitted, wherein the skip-game executing unit collectively executes games selected from among the plurality of displayed games.

Effects of Disclosure

According to the present invention, it is possible to save time and effort of a player.

BRIEF DESCRIPTION OF DRAWINGS

FIG. 9 is a view for explaining a limited-shop lottery table.

DESCRIPTION OF EMBODIMENTS

One aspect of an embodiment of the present invention will be described in detail below with reference to the accompanying drawings. The dimensions, materials, other specific values, etc. given in this embodiment are merely examples for facilitating understanding, and do not limit the present invention unless otherwise specifically mentioned. Note that, in this specification and the drawings, duplication of description will be omitted by assigning identical reference signs to elements that have substantially the same functions and configurations, and elements that are not directly related to the present invention are not shown.

(Overall Configuration of Information Processing System S)

Figure 1:
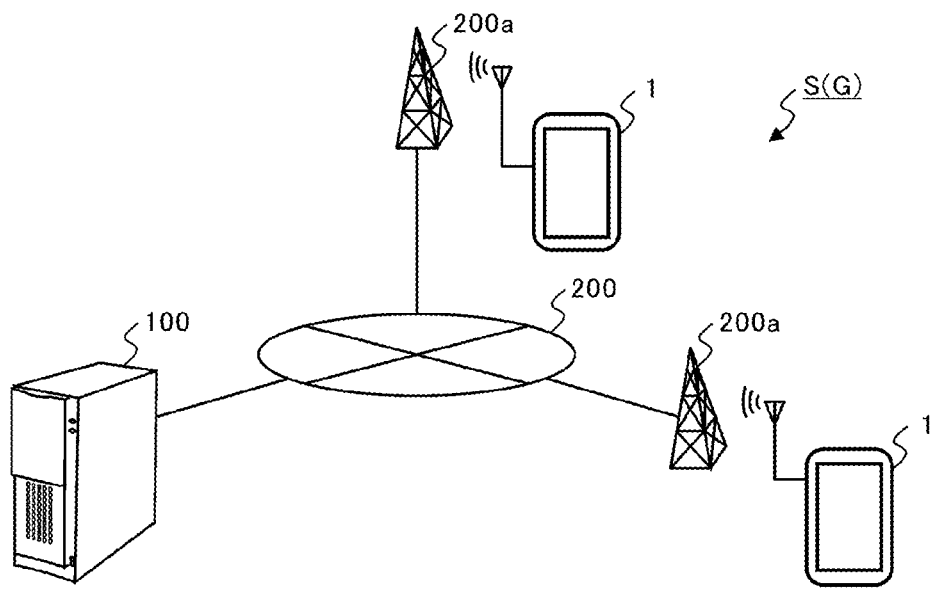
FIG. 1 is an explanatory view showing, in outline, the configuration of an information processing system.

FIG. 1 is an explanatory view showing, in outline, the configuration of an information processing system S. The information processing system S is a so-called client/server system that includes player terminals 1, a server 100, and a communication network 200 having communication base stations 200a.

Each of the player terminals (information processing devices) 1 can establish communication with the server 100 via the communication network 200. The player terminals 1 widely include electronic appliances that can be communicatively connected to the server 100 by wire or wirelessly. Examples of the player terminals 1 include smartphones, mobile phones, tablet devices, personal computers, game machines, or the like. In this embodiment, a description will be given of a case in which smartphones are used as the player terminals 1.

The server 100 is communicatively connected to a plurality of player terminals 1. The server 100 accumulates various kinds of information (player information) for each player ID used to identify a player who plays a game.

The communication base stations 200a are connected to the communication network 200 and send information to and receive information from the player terminals 1 wirelessly. The communication network 200 is configured of a mobile-phone network, the Internet, a local area network (LAN), a dedicated line, or the like, to realize wireless or wired communication connection between the player terminals 1 and the server 100.

In the information processing system S according to this embodiment, each player terminal 1 and the server 100 function as game devices G. The player terminal 1 and the server 100 respectively play roles for controlling the proceeding of a game, whereby it is possible to proceed with the game through cooperation between the player terminal 1 and the server 100.

(Hardware Configuration of Player Terminal 1 and Server 100)

Figure 2A:
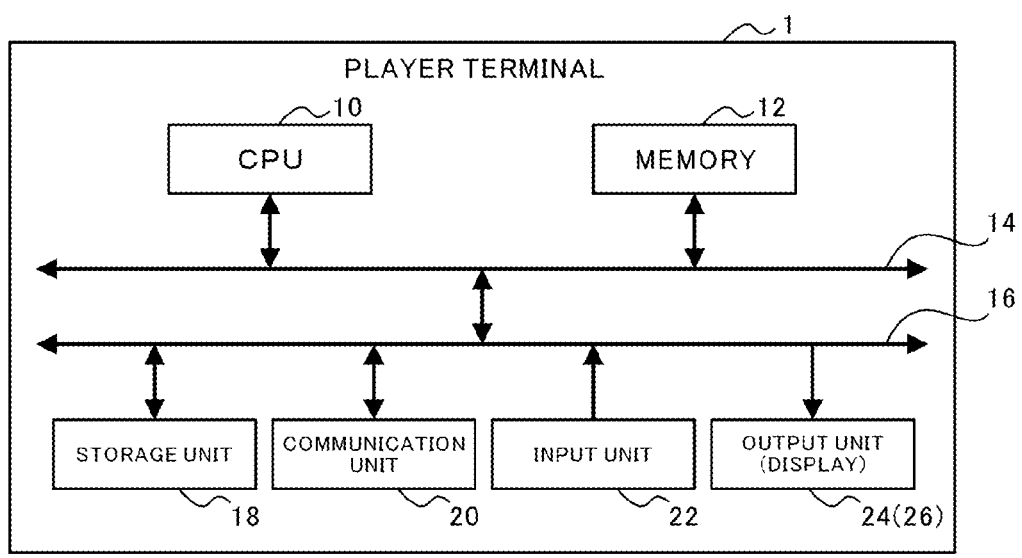
FIG. 2A is a diagram for explaining the hardware configuration of a player terminal.
Figure 2B:
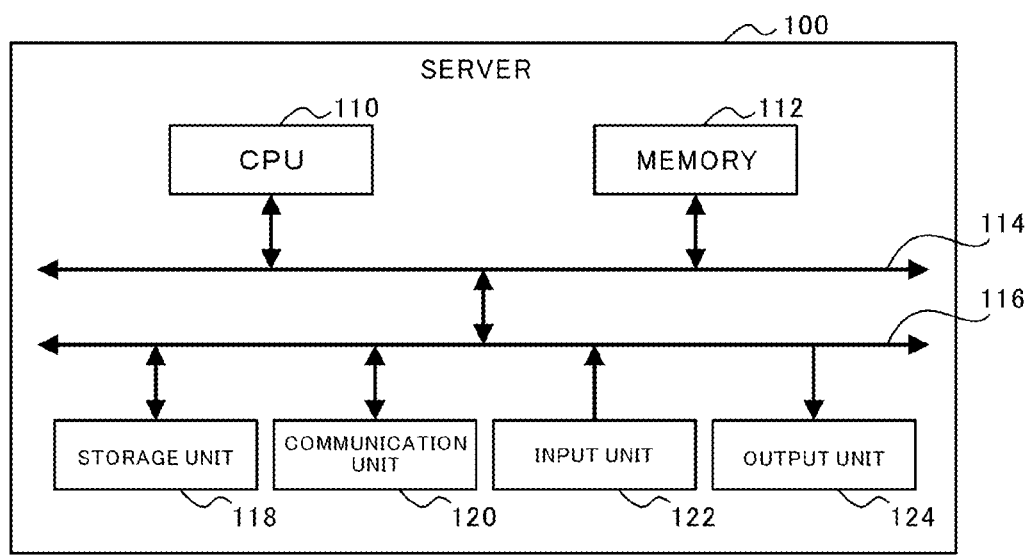
FIG. 2B is a diagram for explaining the hardware configuration of a server.

FIG. 2A is a diagram for explaining the hardware configuration of the player terminal 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and the functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Therefore, the hardware configuration of the player terminal 1 will be described below, and a description of the hardware configuration of the server 100 will be omitted.

The CPU 10 runs a program stored in the memory 12 to control the proceeding of the game. The memory 12 is configured of a read only memory (ROM) or a random access memory (RAN) and stores programs and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, the programs and data stored in the storage unit 18 are loaded into the memory 12 (RAM) by the CPU 10.

The communication unit 20 is communicatively connected to the communication base station 200a wirelessly, and sends information to and receives information from the server 100 via the communication network 200, such as various kinds of data and programs. At the player terminal 1, the programs etc. received from the server 100 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects speech of the player. That is, the input unit 22 may widely include devices that enable the player to input his or her intents in distinguishable manners.

The output unit 24 is configured to include a display device and a speaker. Note that the output unit 24 may be a device connected (externally attached) to the player terminal 1. In this embodiment, the player terminal 1 includes a display 26 as the output unit 24 and includes, as the input unit 22, a touchscreen provided in the display 26 so as to be overlaid thereon.

(Game Content)

Next, an example of the content of a game provided by the information processing system S (game device G) of this embodiment will be described. In this embodiment, so-called battle games in which ally characters battle with enemy characters are provided. Specifically, in the games of this embodiment, a plurality of ally characters are provided. The player selects some (here, five) ally characters from among the provided ally characters to organize a party. Furthermore, the player can play a plurality of kinds of battle games that have different enemy characters and different levels of difficulty. The object of a battle game is that the ally characters organized into the party defeat enemy characters (clear the game) to obtain rewards.

Figure 3A:
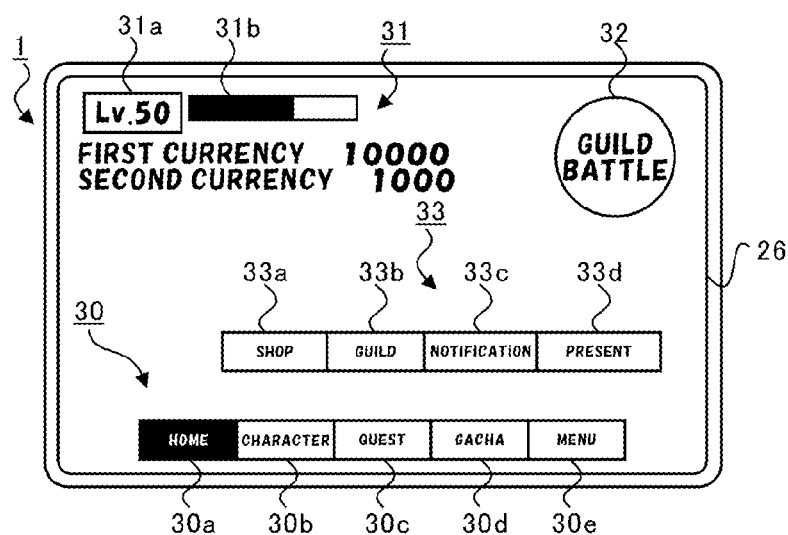
FIG. 3A is a view for explaining an example of a home screen.
Figure 3B:
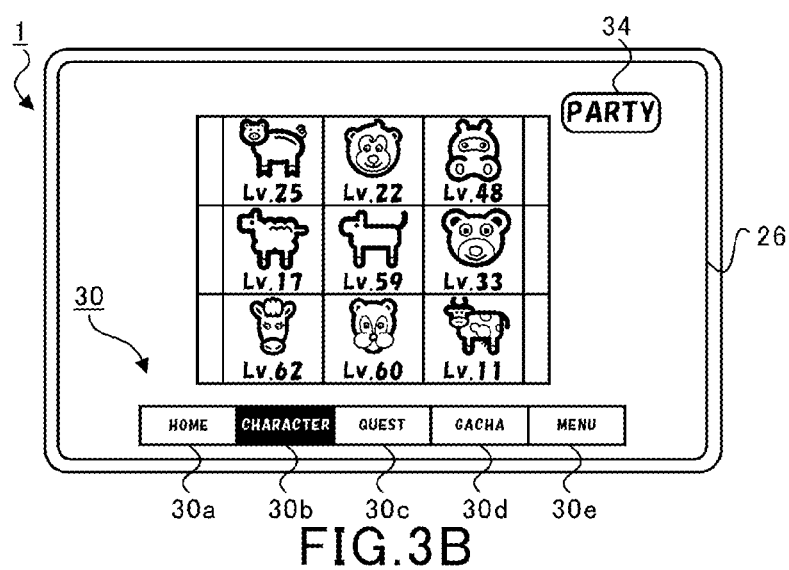
FIG. 3B is a view for explaining an example of an ally-character confirmation screen.
Figure 3C:
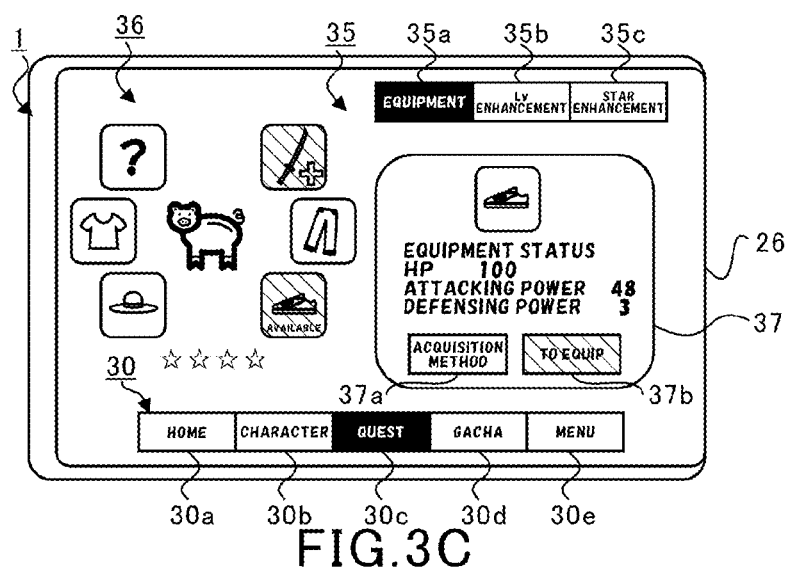
FIG. 3C is a view for explaining an example of an ally-character detail screen.
Figure 4A:
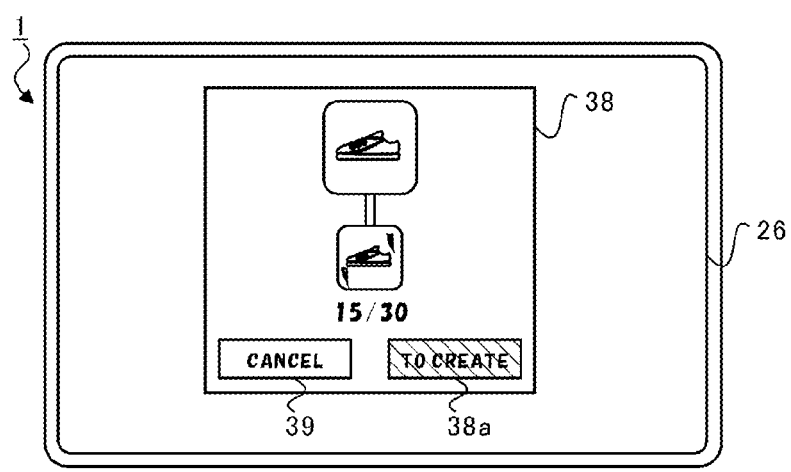
FIG. 4A is a view for explaining an example of an acquisition-method pop-up.
Figure 4B:
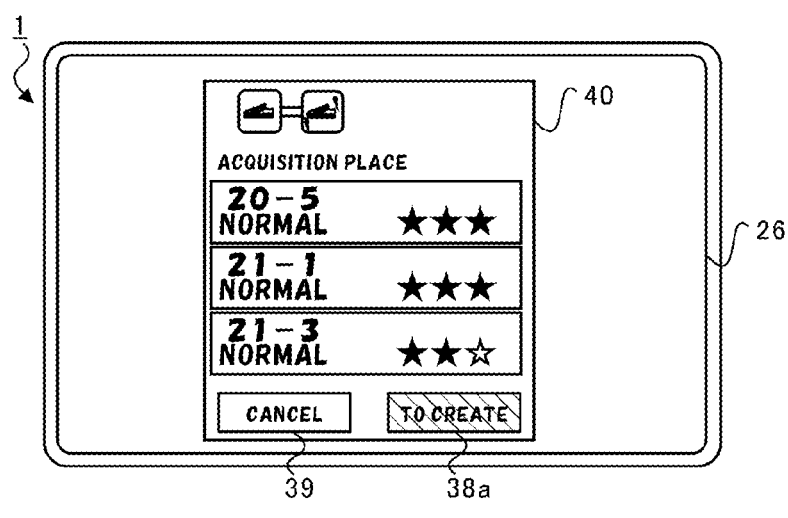
FIG. 4B is a view for explaining an example of an acquisition-place pop-up.
Figure 4C:
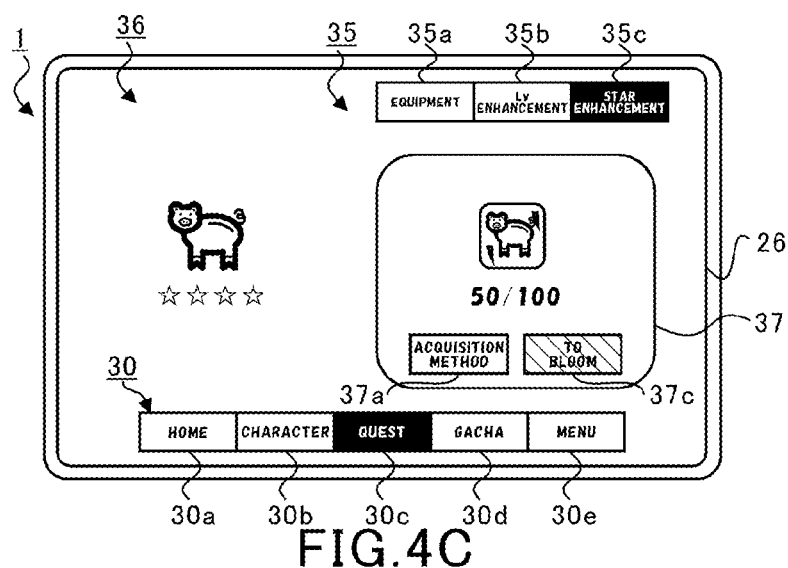
FIG. 4C is a view for explaining an example of the ally-character detail screen.

FIG. 3A is a view for explaining an example of a home screen. FIG. 3B is a view for explaining an example of an ally-character confirmation screen. FIG. 3C is a view for explaining an example of an ally-character detail screen. FIG. 4A is a view for explaining an example of an acquisition-method pop-up 38. FIG. 4B is a view for explaining an example of an acquisition-place pop-up 40. FIG. 4C is a view for explaining an example of the ally-character detail screen. Game screens are displayed on the display 26 of the player terminal 1. In this embodiment, the game screens are roughly divided into normal screens and a battle screen.

The normal screens are screens mainly used when the player performs various settings and confirmation of information. On the other hand, the battle screen is a screen displayed on the display 26 from the start to the end of a battle game. Here, all screens except the battle screen are the normal screens. As the normal screens, a plurality of screens are provided, such as the home screen, which is shown in FIG. 3A, the ally-character confirmation screen, which is shown in FIG. 3B, a quest screen (see FIG. 5A), a shop screen (see FIG. 8A), a guild screen (not shown), a gacha screen (not shown), and a menu screen (not shown).

In the normal screens, a menu bar 30 is displayed in a lower section of the display 26. In the menu bar 30, a plurality of operation sections that can be operated (tapped) by the player are provided. In the menu bar 30, a home-screen selection operation section 30a, in which "home" is written, an ally-character confirmation-screen selection operation section 30b, in which "character" is written, a quest-screen selection operation section 30c, in which "quest" is written, a gacha-screen selection operation section 30d, in which "gacha" is written, and a menu-screen selection operation section 30e, in which "menu" is written, are provided.

Figure 5A:
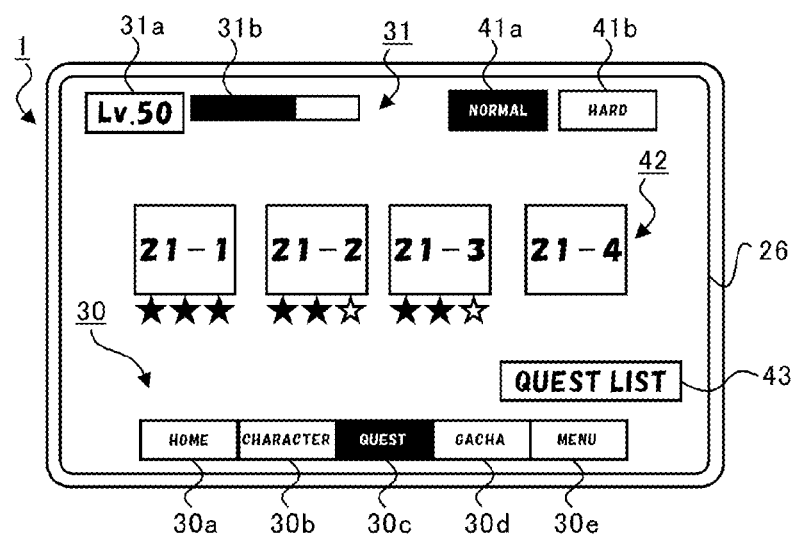
FIG. 5A is a view for explaining an example of a quest screen for a normal quest.

When the home-screen selection operation section 30a is tapped, the home screen, which is shown in FIG. 3A, is displayed on the display 26. Furthermore, when the ally-character confirmation-screen selection operation section 30b is tapped, the ally-character confirmation screen, which is shown in FIG. 3B, is displayed on the display 26. Similarly, when the quest-screen selection operation section 30c is tapped, the quest screen shown in FIG. 5A is displayed on the display 26. Furthermore, when the gacha-screen selection operation section 30d is tapped, the gacha screen is displayed on the display 26. Furthermore, when the menu-screen selection operation section 30e is tapped, the menu screen is displayed on the display 26. Note that, although a detailed description will be omitted, in the gacha screen, it is possible to perform a gacha lottery in which an ally character can be obtained by lottery. Furthermore, in the menu screen, it is possible to perform game settings and confirmation of various kinds of information.

In order for the player to be able to identify the screen currently displayed on the display 26, the operation section corresponding the screen is displayed in a highlighted manner in the menu bar 30.

The home screen, which is shown in FIG. 3A, corresponds to an initial screen, and a header display area 31 is provided at an upper section. In the header display area 31, a level information 31a indicating a player level associated with the player ID, a stamina display bar 31b indicating stamina of the player associated with the player ID, and the possession amounts of a first currency and a second currency associated with the player ID are displayed.

Note that the stamina is a parameter needed to play battle games. In this embodiment, a plurality of kinds of battle games are provided, and a stamina consumption value needed for playing, the number of challenges per day, etc., are set for each of the battle games. In the case where a battle game for which a stamina consumption value needed for playing has been set is played, the player consumes the corresponding stamina to play the battle game; thus, if the stamina is insufficient, the player cannot play the battle game.

Although a detailed description will be omitted, when the player clears a battle game, the player can obtain a predetermined number of points as player experience points. Then, every time the player experience points reach a fixed point, the player level is raised. Upper limit points of the stamina are set for the player level, and the upper limit points of the stamina are increased as the player level is raised. The stamina is restored by a predetermined number of points (for example, 1 point) every fixed period of time (for example, five minutes) within the range defined by the upper limit points. The current remaining amount of the stamina with respect to the upper limit points of the stamina is displayed at the stamina display bar 31b so as to be visually ascertainable.

The first currency and the second currency are currencies available only in the games. For example, when a battle game is cleared, it is possible to obtain a predetermined amount of the first currency in accordance with the cleared battle game. The second currency can be obtained for free or for a fee. Note that, although the first currency and the second currency can be obtained by various methods, a detailed description thereof will be omitted.

Furthermore, a notification-selection operation section 32 may be displayed at a right end of the home screen. Although a detailed description will be omitted, in the case where a guild battle is being held, the notification-selection operation section 32, in which "guild battle" is written, is displayed.

Furthermore, a home menu 33 is displayed between the menu bar 30 and the notification-selection operation section 32 in the home screen. A shop-screen selection operation section 33a, in which "shop" is written, a guild-screen selection operation section 33b, in which "guild" is written, a notification-screen selection operation section 33c, in which "notification" is written, and a present-screen selection operation section 33d, in which "present" is written, are provided in the home menu 33.

When the shop-screen selection operation section 33a is tapped, a shop screen (see FIG. 8A) on which items are available to be purchased is displayed. Furthermore, when the guild-screen selection operation section 33b is operated (tapped), a guild screen (not shown) is displayed on the display 26. Furthermore, when the notification-screen selection operation section 33c is operated (tapped), a notification screen (not shown) for displaying update information, maintenance information, etc., is displayed on the display 26. Furthermore, when the present-screen selection operation section 33d is operated (tapped), a present screen (not shown) for displaying an item distributed by an administrator, for example, is displayed on the display 26.

In the ally-character confirmation screen, which is shown in FIG. 3B, images of ally characters corresponding to ally-character IDs associated with the player ID are all displayed. That is, all ally characters owned by the player are displayed in the ally-character confirmation screen. Note that ally-character IDs are used to identify ally characters, and different IDs are assigned to the individual ally characters. Then, when a player obtains a new ally character, for example, by a gacha lottery etc., the ally character ID of the obtained ally character is associated with the player ID of the player.

A party-screen-selection operation section 34, in which "party" is written, is displayed at a right end of the ally-character confirmation screen. When the party-screen-selection operation section 34 is tapped, a party organizing screen (not shown) is displayed on the display 26, and it is possible to organize and store a party that is organized by at most five ally characters.

The number of stars (rank), experience points, and a level are stored in correspondence with an ally character. The experience points are raised in the case where a battle game, to be described later, is won, or in the case where a predetermined item is used. The level is set in accordance with the experience points, and the level is raised each time the experience points reach a predetermined number of points. Note that an upper limit value of the level is set for each ally character, and the level is raised only within the range defined by the upper limit value.

Furthermore, base values of battle abilities, such as life points, an attacking power, and a defensing power, are set for an ally character on the basis of the number of stars and the level. The player can proceed with the battle game more advantageously as the battle abilities of ally characters become higher. Furthermore, the individual base values set for an ally character are raised as the number of stars thereof is increased, furthermore, as the level thereof becomes higher.

Furthermore, it is possible to equip the ally characters with equipment such as weapons and protective gear (set such equipment for the ally characters). Additional values for the attacking power, the defensing power, etc., are set for each of the items of equipment. When the ally characters are equipped with such equipment, the additional values of the individual items of equipment are added to the above-mentioned base values, thus making it possible to enhance the battle abilities of the ally characters.

Specifically, when the image of an ally character displayed in the ally-character confirmation screen is operated, the ally-character detail screen, which is shown in FIG. 3C, is displayed on the display 26. In the ally-character detail screen, an ally-character-enhancement selection operation section 35, an enhancement-item display area 36, and an enhancement-detail display area 37 are displayed. In the ally-character-enhancement selection operation section 35, an equipment selection operation section 35a, an Lv-enhancement selection operation section 35b, and a star-enhancement selection operation section 35c are provided. In the ally-character-enhancement selection operation section 35, either one of the operation sections is selected, and the selected operation section is highlighted.

When the equipment selection operation section 35a of the ally-character-enhancement selection operation section 35 is selected (operated), six items of equipment are displayed around the image of the ally character in the enhancement-item display area 36. Here, among the six items of equipment, items of equipment with which the ally character is not equipped are displayed in gray, as indicated by hatching in the figure, and items of equipment with which the ally character is equipped are displayed in colors.

Furthermore, as in the upper right item of equipment in the figure, among the items of equipment with which the ally character is not equipped (among the upper right item of equipment and the lower right item of equipment in the figure), a mark indicated by "+" is displayed for an item of equipment that has already been owned (including an item of equipment that can be created). On the other hand, as in the lower right item of equipment in the figure, among those items of equipment, "available" is displayed for an item of equipment that has not been owned (including an item of equipment that cannot be created). Note that, as in the upper left item of equipment in the figure, an item of equipment that has not yet been implemented in games is indicated by "?".

Furthermore, when either one of the items of equipment in the enhancement-item display area 36 is operated (tapped), the status of the operated item of equipment is displayed in the enhancement-detail display area 37. Furthermore, an acquisition-method operation section 37a for displaying how to get the item of equipment and an equipment operation section 37b for causing the ally character to be equipped with the item of equipment are provided in the enhancement-detail display area 37.

Then, when the acquisition-method operation section 37a is operated, the acquisition-method pop-up 38, which is shown in FIG. 4A, is displayed on the display 26. In the acquisition-method pop-up 38, an item required to create the item of equipment is displayed, and the number of items owned by the player with respect to the number of items required to create the item of equipment (required number of items), for example, 15/30, is displayed. Furthermore, in the acquisition-method pop-up 38, a cancel operation section 39, in which "cancel" is written, for cancelling the processing corresponding to the currently displayed screen, and a creation operation section 38a for creating the equipment are displayed. Note that, in the case where the number of items owned by the player does not meet the required number, the equipment operation section 37b and the creation operation section 38a are displayed in gray, as indicated by hatching in the figures, so as not to accept an operation from the player.

Then, when the item displayed in the acquisition-method pop-up 38 is operated (tapped), the acquisition-place pop-up 40, which is shown in FIG. 4B, is displayed on the display 26. As described in detail later, for each battle game, items that can be obtained when the game is cleared are set in advance. Then, in the acquisition-place pop-up 40, battle games from which the item operated in the acquisition-method pop-up 38 can be obtained are displayed.

Furthermore, the cancel operation section 39 and the creation operation section 38a are displayed in the acquisition-place pop-up 40. After that, when a battle game displayed in the acquisition-place pop-up 40 is operated (tapped), a quest selection screen (see FIG. 5B), to be described later, is displayed on the display 26.

Then, in the case where the number of items owned by the player meets the required number, the creation operation section 38a, which is shown in FIGS. 4A and 4B, is enabled, and, when the creation operation section 38a is operated, the corresponding equipment is created. Furthermore, in the case where the number of items owned by the player meets the required number, the equipment operation section 37b, which is shown in FIG. 3C, is enabled, and, when the equipment operation section 37b is operated (tapped), the ally character is equipped with that item of equipment.

Furthermore, although a detailed description will be omitted, when the Lv-enhancement selection operation section 35b in the ally-character detail screen, which is shown in FIG. 3C, is operated (tapped), the level of the ally character is displayed in the enhancement-item display area 36, and an item for raising the level is displayed in the enhancement-detail display area 37. Then, the item is operated (tapped), whereby the tapped item is used, and the experience points (level) of the ally character are then raised.

Furthermore, when the star-enhancement selection operation section 35c in the ally-character detail screen, which is shown in FIG. 3C, is operated (tapped), the current number of stars (rank) of the ally character is displayed in the enhancement-item display area 36, and an item for increasing the number of stars is displayed in the enhancement-detail display area 37, as shown in FIG. 4C. In the enhancement-detail display area 37, an item required for increasing the number of stars is displayed, and the number of items owned by the player with respect to the number of items (required number) required for increasing the number of stars, for example, 50/100, is displayed.

Furthermore, the acquisition-method operation section 37a for displaying how to get the item and a blooming operation section 37c for increasing the number of stars are provided in the enhancement-detail display area 37. In the case where the acquisition-method operation section 37a is operated, the acquisition-method pop-up 38, which is shown in FIG. 4A, is displayed. Furthermore, when the number of items owned by the player meets the required number, and the blooming operation section 37c is operated, the number of stars of the ally character is increased by one. Note that, in the case where the number of items for increasing the number of stars does not meet the required number, the blooming operation section 37c is displayed in gray, as indicated by hatching in FIG. 4C, so as not to accept an operation from the player.

Figure 5B:
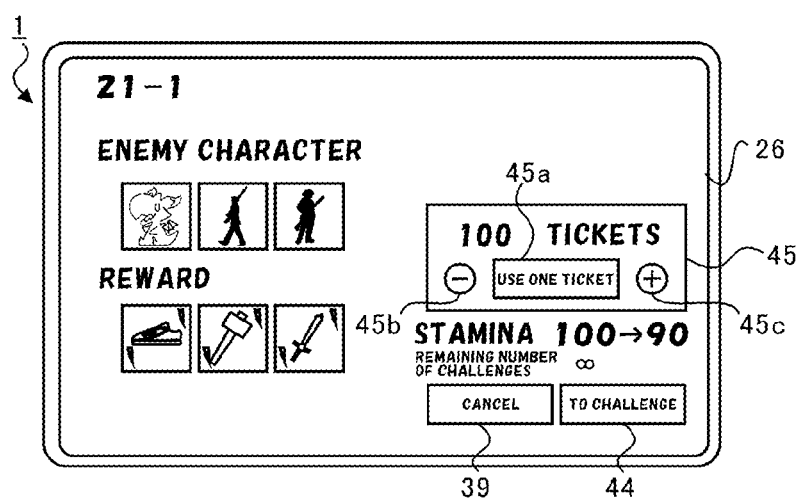
FIG. 5B is a view for explaining an example of a quest selection screen for the normal quest.
Figure 5C:
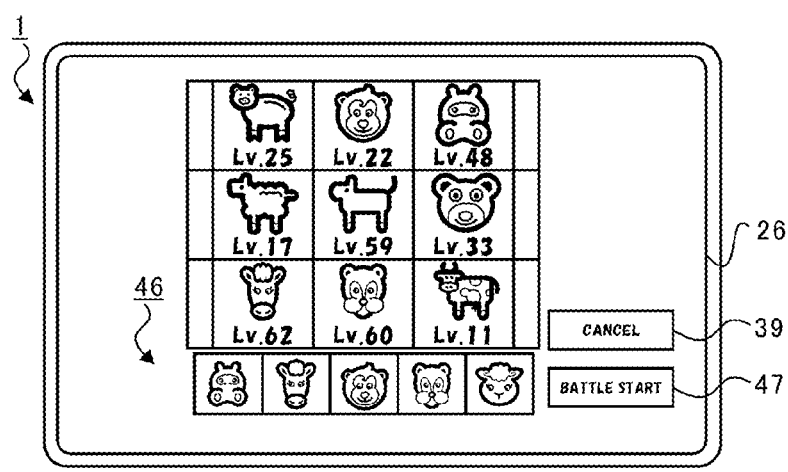
FIG. 5C is a view for explaining an example of a party selection screen.

FIG. 5A is a view for explaining an example of a quest screen for a normal quest. FIG. 5B is a view for explaining an example of a quest selection screen for the normal quest. FIG. 5C is a view for explaining an example of a party selection screen.

When the quest-screen selection operation section 30c is operated (tapped) in the home screen, which is shown in FIG. 3A, the quest screen shown in FIG. 5A is displayed on the display 26. Note that, in this embodiment, although a description will be given of an example case in which there are two classifications, i.e., a normal quest and a hard quest, to which battle games belong, battle games belonging to another classification (guild battle or the like) may also be provided.

Note that an opening condition may be set depending on the classification of battle games. The opening condition can be, for example, a condition that the player level is equal to or greater than a predetermined value, a condition that another predetermined battle game is cleared, etc. Furthermore, a plurality of battle games (hierarchy) belong to each battle-game classification. The opening condition is also set for these individual battle games. Then, when the opening condition is satisfied, game opening information included in the player information is updated.

In the quest screen, a normal-quest selection operation section 41a for selecting the normal quest and a hard-quest selection operation section 41b for selecting the hard quest are provided. In the quest screen, either the normal-quest selection operation section 41a or the hard-quest selection operation section 41b is always selected, and the normal-quest selection operation section 41a is selected in the initial state.

In the case where the normal-quest selection operation section 41a is selected, a quest operation section 42 for selecting any one of a plurality of battle games (hierarchy) that belong to the normal quest is displayed in the quest screen. Furthermore, a quest list operation section 43 for skipping one or a plurality of battle games collectively is displayed in the quest screen. Note that details of screen transition and processing when the quest list operation section 43 is operated (tapped) will be described later.

In the quest operation section 42, clear information for each of the battle games is also displayed. The clear information is indicated by three stars, for example. In a battle game, if the battle game is cleared, the corresponding number of stars is obtained in accordance with the number of ally characters whose life points are 0 when the battle game is cleared. For example, three stars are obtained in the case where there is no ally character whose life points are 0, two stars are obtained in the case where there is one ally character whose life points are 0, and one star is obtained in the case where there are two or more ally characters whose life points are 0.

In the example shown in FIG. 5A, three stars have been obtained in a battle game "21-1", two stars have been obtained in a battle game "21-2", and two stars have been obtained in a battle game "21-3". Furthermore, no star is obtained in a battle game "21-4", which indicates that this battle game has not been cleared.

Note that an opening condition that the previous battle game is cleared is set in the quests (the normal quest and the hard quest). For example, in the example shown in FIG. 5A, the battle games up to "21-3" have been cleared, so that the battle game "21-4" is opened, but battle games thereafter (a battle game "21-5" and the subsequent battle games, not shown) are unopened.

When the quest operation section 42 for the battle game "21-1", for example, is operated (tapped) in the quest screen, the quest selection screen shown in FIG. 5B is displayed on the display 26. In the quest selection screen, enemy characters that appear in the battle game and items (rewards) that can be obtained from the battle game are displayed. Furthermore, the stamina before and after execution of the battle game and the remaining number of challenges are displayed in the quest selection screen. Note that the remaining number of challenges indicates the number of challengeable times in a day and is set to be infinite for battle games of the normal quest. Furthermore, in this embodiment, the stamina to be consumed in a battle game of the normal quest is set to 10. However, the stamina to be consumed in a battle game of the normal quest may also be different for each battle game.

Furthermore, in the quest selection screen, the cancel operation section 39 and a challenge operation section 44, in which "to challenge" is written, for challenging the battle game are displayed.

When the cancel operation section 39 is operated (tapped), the quest screen shown in FIG. 5A is displayed on the display 26, and challenge to the selected battle game "21-1" is cancelled.

On the other hand, when the challenge operation section 44 is operated (tapped), the party selection screen shown in FIG. 5C is displayed on the display 26. In the party selection screen, all ally characters owned by the player are displayed, and a selected-ally-character display area 46 for displaying selected ally characters is displayed below.

Furthermore, the cancel operation section 39 and a battle-start operation section 47, in which "battle start" is written, are displayed in the party selection screen.

When the player operates (taps) some of the ally characters displayed in the party selection screen, the operated ally characters are displayed in the selected-ally-character display area 46. That is, here, from among the plurality of ally character IDs associated with the player ID, ally character IDs to be used in the battle game (for determining a party) are selected.

Then, when the ally characters (the ally character IDs) are selected, and the battle-start operation section 47 is operated (tapped), the battle game is started.

Figure 6A:
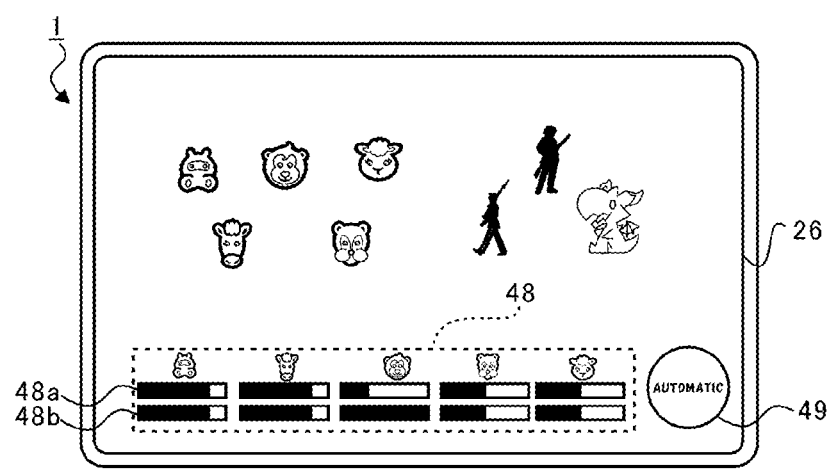
FIG. 6A is a view for explaining an example of a battle screen.
Figure 6B:
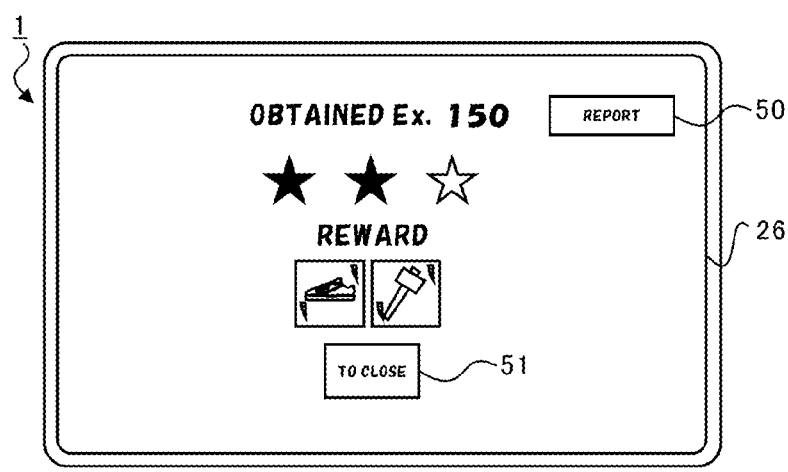
FIG. 6B is a view for explaining an example of a result screen.
Figure 6C:
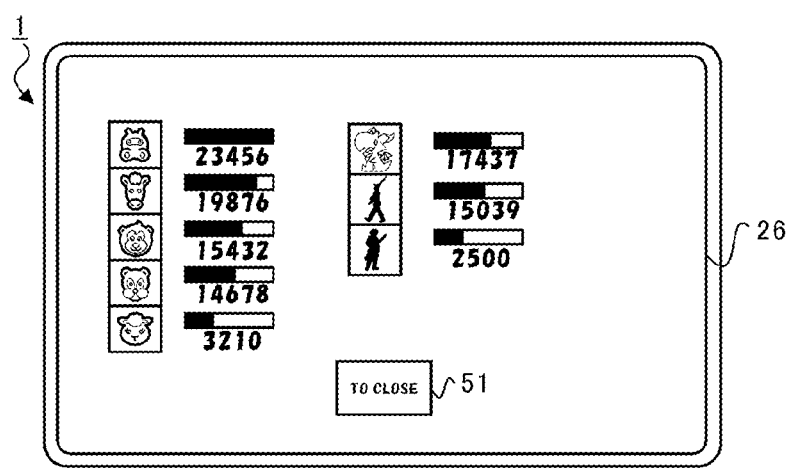
FIG. 6C is a view for explaining an example of a report screen.

FIG. 6A is a view for explaining an example of a battle screen. FIG. 6B is a view for explaining an example of a result screen. FIG. 6C is a view for explaining an example of a report screen. When the battle-start operation section 47 is operated (tapped) in the party selection screen, which is shown in FIG. 5C, the battle game is started.

During the battle game, the battle screen is displayed as shown in FIG. 6A. In the battle screen, the ally characters and the enemy characters are displayed on the display 26. The ally characters act under computer control, give damage to the enemy characters, and receive damage from the enemy characters. Furthermore, the enemy characters act under computer control, give damage to the ally characters, and receive damage from the ally characters.

When damage points are assigned to any of the enemy characters, the damage points are subtracted from the life points of the enemy character. Similarly, when damage points are assigned to any of the ally characters, the damage points are subtracted from the life points of the ally character. The player wins (clears) when the life points of all the enemy characters become 0, and the player loses when the life points of all the ally characters become 0 (lose).

Here, as shown in FIG. 6A, an ally-character display area 48 is provided in a lower section of the battle screen. In the ally-character display area 48, life points 48a and a deathblow gauge 48b for each of the ally characters are displayed. The deathblow gauge 48b is raised when the ally character receives damage from an enemy character or gives damage to an enemy character. Then, when the deathblow gauge 48b reaches a predetermined maximum value, the ally character becomes able to use the deathblow. With the deathblow, damage points assigned to an enemy character are greater than with a normal attack, the life points of the ally character are restored, and a special effect is assigned to the enemy character.

Here, two methods to use the deathblow are provided: in one method, the player operates (taps) the ally character that is displayed in the ally-character display area 48 and of which the deathblow gauge 48b reaches the maximum value; and, in another method, when the deathblow gauge 48b reaches the maximum value in an automatic state, the corresponding ally character uses the deathblow under computer control. Note that an automatic selection operation section 49 is displayed in the battle screen, and it is possible to switch between the automatic state and a manual state in accordance with an operation on the automatic selection operation section 49. When the automatic selection operation section 49 is operated in the manual state, the automatic state, in which the deathblow is automatically used, is selected. Furthermore, when the automatic selection operation section 49 is operated in the automatic state, the manual state, in which the deathblow is manually used, is selected. Note that, even in the automatic state, in a state in which the deathblow gauge 48b has reached the maximum value and in which the deathblow has not been used under computer control, when the player operates (taps) the corresponding ally character, the deathblow can be used.

Then, when the battle game ends normally (normal end), a result screen is displayed on the display 26, as shown in FIG. 6B. FIG. 6B shows an example of the result screen displayed when the battle game is cleared.

In the result screen, at least part of game result information for the battle game is displayed, and a report display operation section 50, in which "report" is written, and an end operation section 51, in which "to close" is written, are displayed.

Note that the game result information includes the ally character IDs (party) of the ally characters, the enemy character IDs of the enemy characters, the remaining states of the ally characters and the enemy characters when the battle ends (whether the life points become 0 when the battle game ends), the damage points given (total value), whether the manual state or the automatic state is selected, the battle log ID, the classification of the battle game (the normal quest, the hard quest, or the like), information associated with each battle-game classification (clear information, hierarchy of the battle game, etc.), assigned-item information, the first currency assigned, etc. Furthermore, the battle log ID is uniquely assigned to each battle game. Furthermore, information associated with each battle-game classification has content different for each battle-game classification. Furthermore, in the case where the battle game is cleared, the server 100 determines by lottery, for each item preset for the cleared battle game, whether the item is assigned to the player. Then, an item to be assigned to the player is assigned to the game result information and is displayed in the result screen.

When the end operation section 51 is operated (tapped) in the result screen, the display on the display 26 is switched from the battle screen to a normal screen. That is, the result screen is part of the battle screen. Note that the normal screen switched from the result screen may be the screen that was displayed immediately before being switched to the battle screen or may be a predetermined screen such as the home screen. In this way, the battle game ends at the end of display of the result screen.

When the report display operation section 50 is operated (tapped) in the result screen, the report screen, which is shown in FIG. 6C, is displayed on the display 26. In the report screen, the damage points (total values) given by the ally characters and the enemy characters are displayed, and the end operation section 51 is displayed.

When the end operation section 51 is operated (tapped), the result screen, which is shown in FIG. 6B, is displayed on the display 26.

Furthermore, in the quest selection screen shown in FIG. 5B, a ticket display area 45 is provided. In the ticket display area 45, the number of tickets owned by the player (the number of tickets associated with the player ID) is displayed, and a ticket-use challenge operation section 45a, a minus operation section 45b, and a plus operation section 45c are provided. The ticket-use challenge operation section 45a, the minus operation section 45b, and the plus operation section 45c are enabled only for a battle game in which three stars have been obtained as the clear information and cannot be operated for a battle game in which three stars have not been obtained as the clear information.

In the case where the ticket-use challenge operation section 45a, the minus operation section 45b, and the plus operation section 45c are enabled, every time the plus operation section 45c is operated (tapped), the text written in the ticket-use challenge operation section 45a is changed such that the number of tickets to be used is incremented by one, as in "use two tickets" and "use three tickets". Furthermore, every time the minus operation section 45b is operated (tapped), the text written in the ticket-use challenge operation section 45a is changed such that the number of tickets to be used is decremented by one, as in "use two tickets" and "use one ticket".

Then, for example, in the case where the text written in the ticket-use challenge operation section 45a indicates "use five tickets", when the ticket-use challenge operation section 45a is operated (tapped), five tickets and a stamina of 50 are consumed, and formation of a party in the party selection screen, which is shown in FIG. 5C, and execution of the battle game in the battle screen, which is shown in FIG. 6A, are omitted (skipped), whereby the battle game is treated as being cleared all (five) times, and the result screen, which is shown in FIG. 6B, is displayed. In this result screen, items obtained from five rounds of the battle game are collectively displayed.

In this way, a battle game in which three stars have been obtained as the clear information is omitted by consuming a ticket, whereby the battle game is treated as being cleared. Accordingly, the player can collect items while saving time.

Figure 7A:
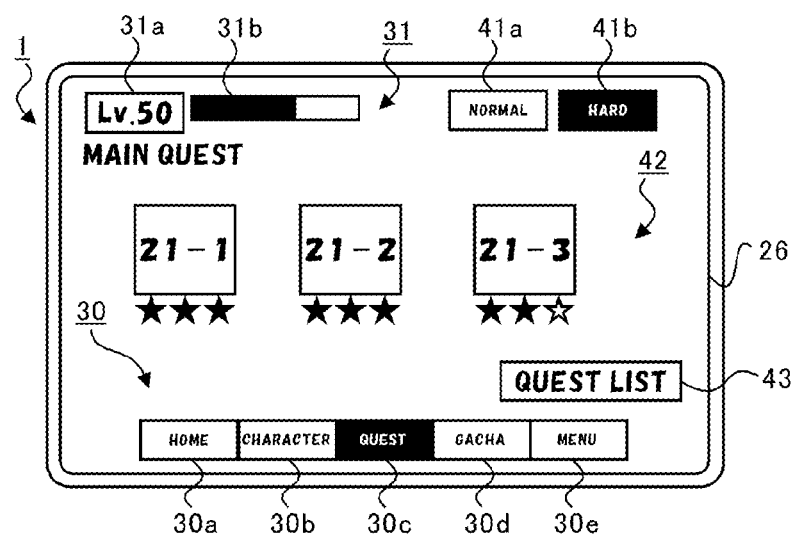
FIG. 7A is a view for explaining an example of a quest screen for a hard quest.
Figure 7B:
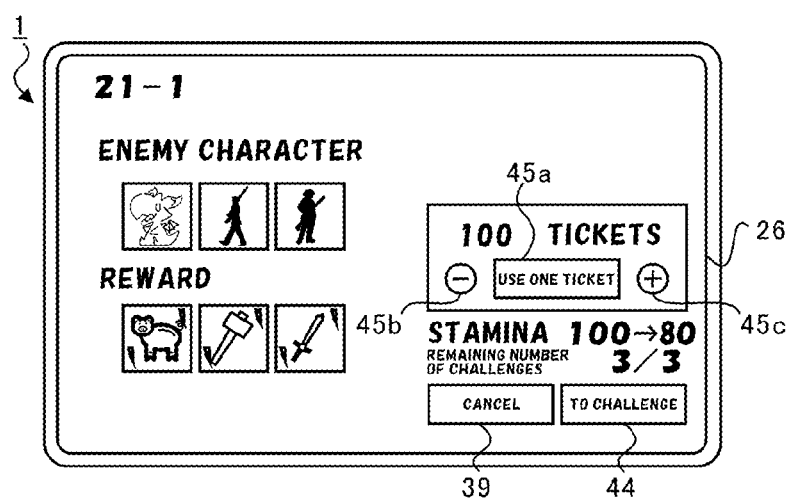
FIG. 7B is a view for explaining an example of a quest selection screen for the hard quest.

Next, the hard quest will be described below. FIG. 7A is a view for explaining an example of a quest screen for the hard quest. FIG. 7B is a view for explaining an example of a quest selection screen for the hard quest. Note that a description of the same sections as those in the normal quest will be omitted. As shown in FIG. 7A, in the case where the hard-quest selection operation section 41b is selected, the quest operation section 42 for selecting any one of a plurality of battle games (hierarchy) that belong to the hard quest is displayed in the quest screen. Furthermore, the quest list operation section 43 for skipping one or a plurality of battle games collectively is displayed in the quest screen. Note that details of screen transition and processing when the quest list operation section 43 is operated (tapped) will be described later.

In the quest operation section 42, clear information for each of the battle games is also displayed. In the example shown in FIG. 7A, three stars have been obtained in the battle game "21-1", three stars have been obtained in the battle game "21-2", and two stars have been obtained in the battle game "21-3".

When the quest operation section 42 for the battle game "21-1", for example, is operated (tapped) in the quest screen, the quest selection screen shown in FIG. 7B is displayed on the display 26. Unlike the normal quest, the number of challenges in a day is set to 3 in the hard quest. Therefore, when the battle game is challenged by using a ticket, in the case where the text written in the ticket-use challenge operation section 45a indicates "use three tickets", even if the plus operation section 45c is further operated (tapped), the text is not changed.

Then, in the case where one battle game has been challenged three times, the remaining number of challenges in that day becomes 0 (0/3). However, the remaining number of challenges can be restored to 3 by consuming the second currency, only once in a day. That is, one battle game of the hard quest can be challenged up to six times in a day.

Furthermore, in this embodiment, the stamina to be consumed in a battle game of the hard quest is set to 20. However, the stamina to be consumed in a battle game of the hard quest may be different for each battle game or may be set to 10, which is the same as in the normal quest.

Furthermore, in the case where a battle game of the hard quest is cleared, an item for increasing the number of stars of the ally character can be obtained. On the other hand, even when a battle game of the normal quest is cleared, an item for increasing the number of stars of the ally character cannot be obtained.

Figure 8A:
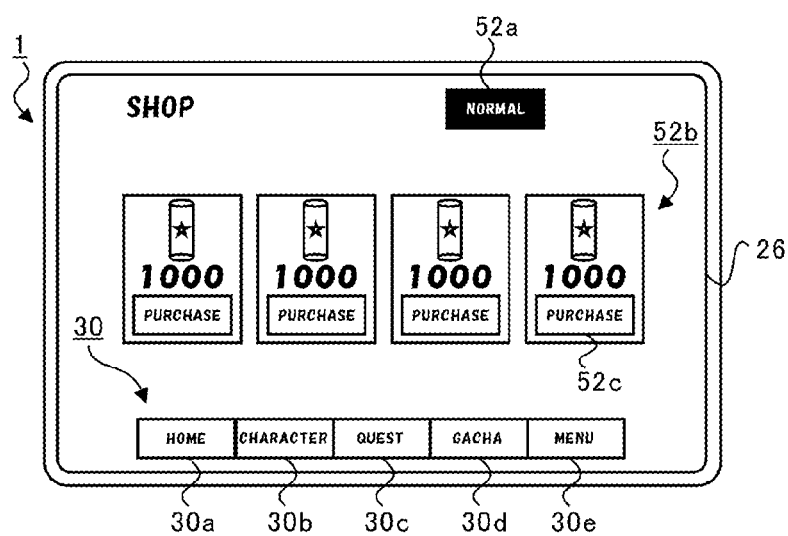
FIG. 8A is a view for explaining an example of a shop screen for a normal shop.
Figure 8B:
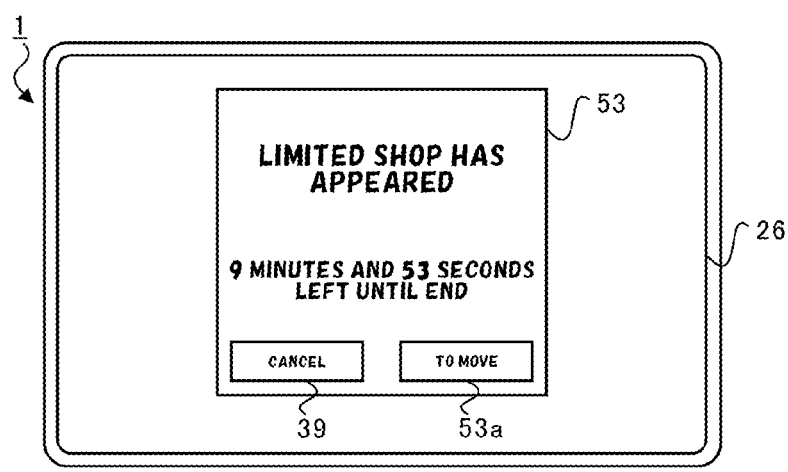
FIG. 8B is a view for explaining an example of a limited-shop appearance pop-up.
Figure 8C:
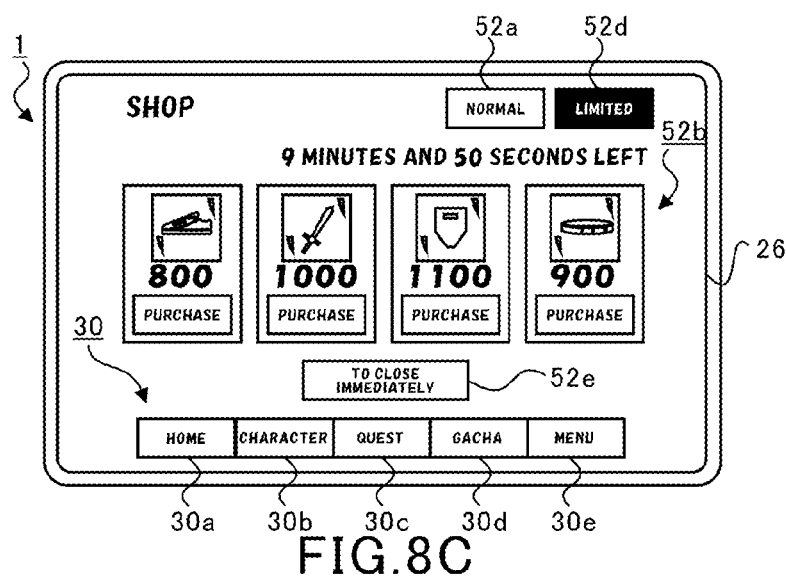
FIG. 8C is a view for explaining an example of a shop screen for a limited shop.

Next, shop screens will be described below. FIG. 8A is a view for explaining an example of a shop screen for a normal shop. FIG. 8B is a view for explaining an example of a limited-shop appearance pop-up. FIG. 8C is a view for explaining an example of a shop screen for a limited shop. FIG. 9 is a view for explaining a limited-shop lottery table.

When the shop-screen selection operation section 33a is operated (tapped) in the home screen, which is shown in FIG. 3A, the shop screen for the normal shop, which is shown in FIG. 8A, is displayed on the display 26. In the shop screen for the normal shop, a normal selection operation section 52a, in which "normal" is written, is selected and displayed, and a plurality of item purchase display areas 52b are displayed as the normal shop. In each of the item purchase display areas 52b, an item that can be purchased, the first currency required to purchase the item, and a purchase operation section 52c for purchase are provided. When the purchase operation section 52c is operated (tapped), it is possible to purchase the item displayed in the item purchase display area 52b where the operated purchase operation section 52c is provided. Note that, in each item purchase display area 52b displayed in the normal shop screen, the content of an item is replaced or can be purchased again, in a predetermined cycle (for example, twice a day).

Furthermore, when the above-described battle games are cleared, the server 100 determines by lottery whether a limited shop is made to appear. Furthermore, in the case where it is determined that the limited shop is made to appear, the server 100 determines a termination condition (in this embodiment, elapse of 10 minutes) for the limited shop and items that can be purchased in the limited shop. Then, in the case where it is determined at the server 100 that the limited shop is made to appear, a limited-shop appearance pop-up 53 shown in FIG. 8B is displayed on the display 26 so as to be overlaid on the result screen, which is shown in FIG. 6B.

In the limited-shop appearance pop-up 53, a message indicating that the limited shop has appeared and the period of time left until the limited shop is terminated (here, 9 minutes and 53 seconds) are displayed, and a limited-shop operation section 53a for transition to the limited shop is displayed.

When the limited-shop operation section 53a is operated (tapped), a shop screen for the limited shop shown in FIG. 8C is displayed. In the shop screen for the limited shop, the normal selection operation section 52a and a limited selection operation section 52d, in which "limited" is written, are displayed. Note that either the normal selection operation section 52a or the limited selection operation section 52d is always selected, and the limited selection operation section 52d is selected in the case shown in FIG. 8C. Furthermore, the period of time left until the limited shop is terminated (here, 9 minutes and 50 seconds) is displayed near the limited selection operation section 52d.

The plurality of item purchase display areas 52b are displayed also in the shop screen for the limited shop. However, in the shop screen for the limited shop, different items from those in the shop screen for the normal shop can be purchased.

Furthermore, in the shop screen for the limited shop, an immediate-close operation section 52e, in which "to close immediately" is written, is provided, and, even if the termination condition is not established (even if 10 minutes have not yet elapsed), when the immediate-close operation section 52e is operated, the shop screen for the limited shop is hidden.

When a battle game is cleared, the server 100 refers to the limited-shop lottery table, which is shown in FIG. 9, to determine by lottery whether the limited shop is made to appear (whether the content is opened). When a battle game is cleared once, the server 100 performs a lottery to determine whether the limited shop is made to appear, at a winning probability of 10%. Furthermore, in the case where the first lottery is not won, when a battle game is cleared next (at the second time), the server 100 performs a lottery to determine whether the limited shop is made to appear, at a winning probability of 20%. In this way, the server 100 performs a lottery to determine whether the limited shop is made to appear, such that the winning probability is increased every time a battle game is cleared. Note that it is configured such that the limited shop is made to appear at least once when battle game(s) is/are cleared ten times.

Then, after the limited shop appears, when a battle game is again cleared once, whether the limited shop is made to appear is determined by lottery at a winning probability of 10%. Note that the number of times to open the limited shop is set to five at most in a day as an upper limit value. However, the upper limit value of the number of times to open may not be set.

Figure 10A:
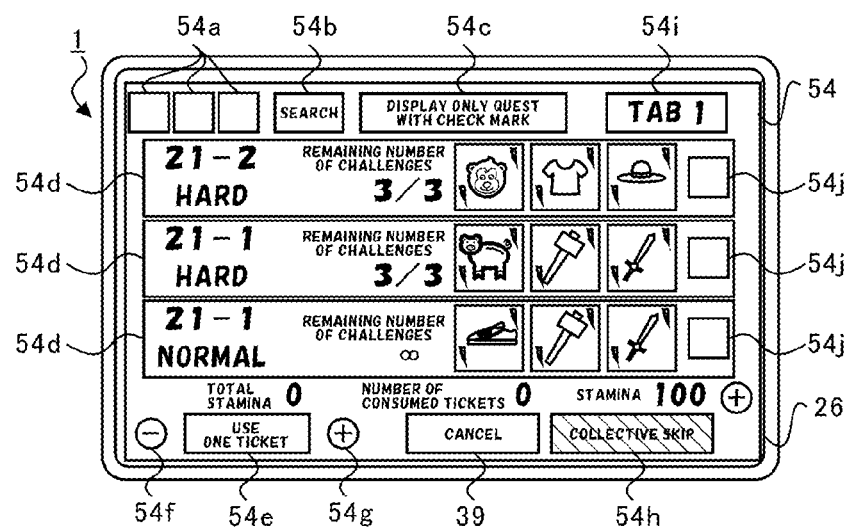
FIG. 10A is a first view for explaining an example of a quest list pop-up.
Figure 10B:
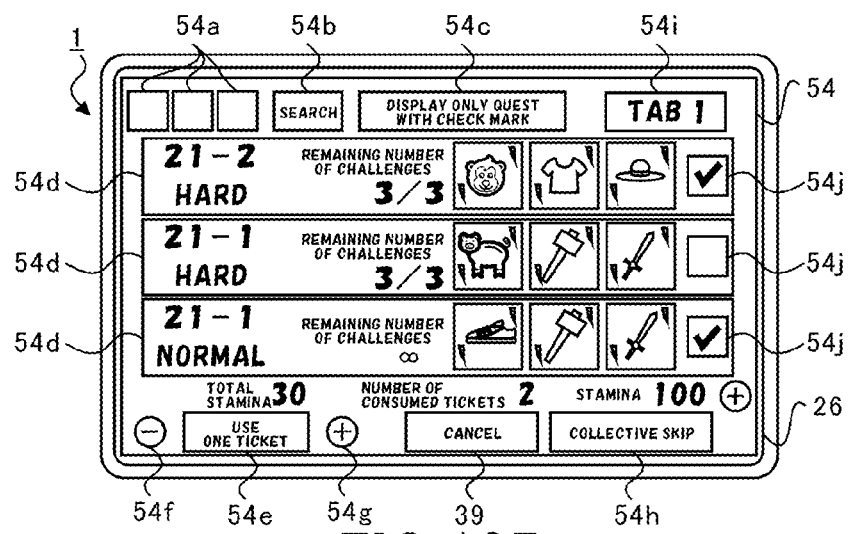
FIG. 10B is a second view for explaining an example of the quest list pop-up.
Figure 10C:
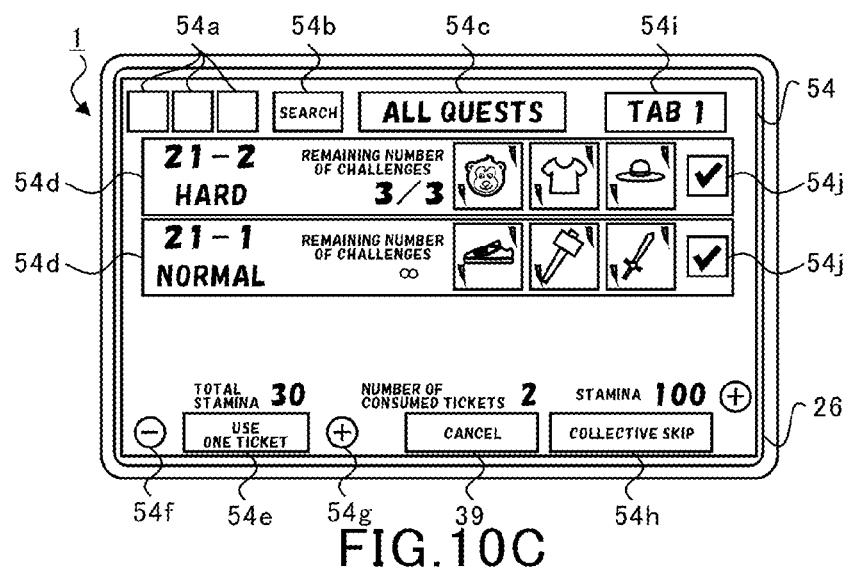
FIG. 10C is a third view for explaining an example of the quest list pop-up.
Figure 11A:
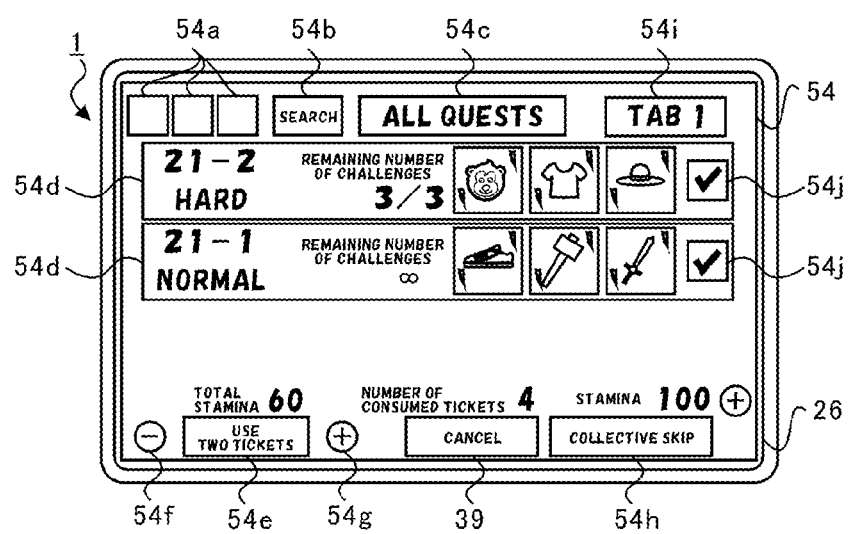
FIG. 11A is a fourth view for explaining an example of the quest list pop-up.
Figure 11B:
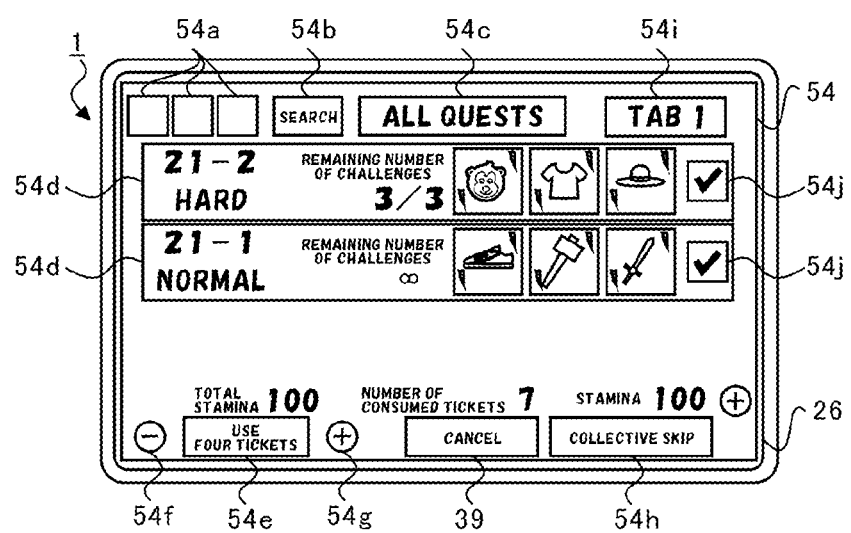
FIG. 11B is a fifth view for explaining an example of the quest list pop-up.
Figure 11C:
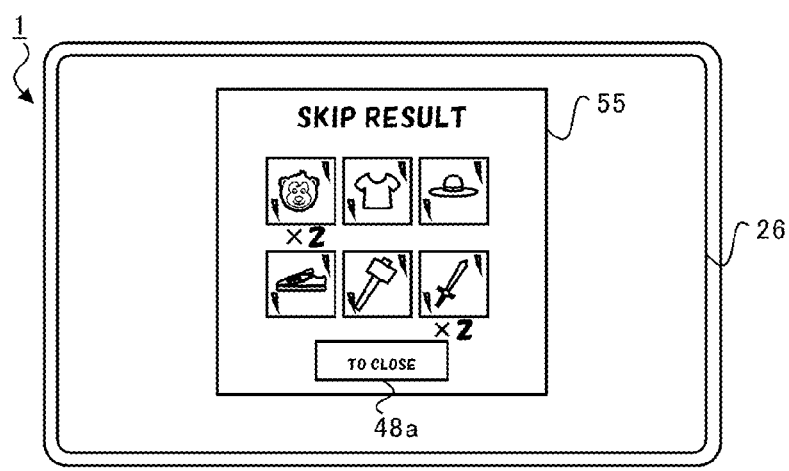
FIG. 11C is a view for explaining an example of a skip result pop-up.

FIG. 10A is a first view for explaining an example of a quest list pop-up 54. FIG. 10B is a second view for explaining an example of the quest list pop-up 54. FIG. 10C is a third view for explaining an example of the quest list pop-up 54. FIG. 11A is a fourth view for explaining an example of the quest list pop-up 54. FIG. 11B is a fifth view for explaining an example of the quest list pop-up 54. FIG. 11C is a view for explaining an example of a skip result pop-up 55.

As described above, in the normal quest and the hard quest, by consuming a ticket for a battle game in which three stars have been obtained as the clear information, at least part of the battle game is omitted, whereby the battle game is treated as being cleared. Accordingly, the player can obtain a desired item early and easily.

However, the player used to take time and effort on the work for selecting one battle game to which a desired reward could be assigned and for obtaining the item by consuming a ticket for the selected battle game.

Thus, in this embodiment, tickets are collectively consumed for a plurality of battle games, to treat the plurality of battle games as being collectively cleared, thereby making it possible to collectively obtain items that can be obtained from the plurality of battle games. Specifically, when the quest list operation section 43 is operated (tapped) in the quest screens, which are shown in FIG. 5A and FIG. 7A, the quest list pop-up 54 shown in FIG. 10A is displayed on the display 26.

In the quest list pop-up 54, three item selection fields 54a, a search operation section 54b, and a display switch operation section 54c are displayed at an upper region. Furthermore, one or a plurality of battle-game display areas 54d are displayed at a center region in the quest list pop-up 54. Furthermore, the total stamina, the number of consumed tickets, and the current stamina are displayed below the battle-game display areas 54d in the quest list pop-up 54. Note that an icon (operation section) for displaying, on the display 26, a pop-up for restoring the stamina is provided at the right side of the current stamina. The player operates (taps) the icon and consumes the second currency, for example, according to an indication in the pop-up displayed on the display 26, thereby making it possible to restore the stamina by a predetermined amount. At this time, the stamina can be restored beyond an upper limit value thereof.

Furthermore, in the quest list pop-up 54, a number-of-tickets display field 54e, a minus operation section 54f, a plus operation section 54g, the cancel operation section 39, and a collective skip operation section 54h are displayed. Furthermore, a tab-name display field 54i is displayed in the quest list pop-up 54 at the right side of the display switch operation section 54c. Note that, although a detailed description will be omitted, when the tab-name display field 54i is operated, one tab name can be selected from among a plurality of tab names.

The item selection fields 54a are blank in the initial state, i.e., no items are selected. In this state, in the battle-game display areas 54d, battle games in which three stars have been obtained as the clear information are displayed from above in order of difficulty from high difficulty toward low difficulty. Furthermore, in each of the battle-game display areas 54d, the remaining number of challenges for the battle game and items that can be obtained from the battle game are displayed, and a check-mark input field 54j is provided.

When the player operates (taps) the check-mark input field 54j, a check mark can be input therein, as shown in FIG. 10B. Note that, when the check-mark input field 54j in which a check mark has been input is operated (tapped) again, the check mark can be removed.

In a state in which a check mark is input in one or a plurality of check-mark input fields 54j, when the display switch operation section 54c is operated (tapped), only the battle-game display areas 54d of battle games for which a check mark has been input in the check-mark input fields 54j are displayed in the quest list pop-up 54, as shown in FIG. 10C. Note that, when the display switch operation section 54c is operated (tapped) again, the battle-game display area 54d of a battle game for which a check mark has not been input in the check-mark input field 54j is also displayed in the quest list pop-up 54.

As shown in FIGS. 10B and 10C, when a check mark is input in one or a plurality of check-mark input fields 54j, the stamina required to execute the battle game(s) for which a check mark has been input is displayed as the total stamina. Furthermore, the number of tickets required to execute the battle game(s) for which a check mark has been input is displayed as the number of consumed tickets.

Then, for example, in a state in which the quest list pop-up 54 shown in FIG. 10C is displayed, when the plus operation section 54g is operated once, as shown in FIG. 11A, "use two tickets" is displayed in the number-of-tickets display field 54e. Furthermore, the stamina required to execute, two times, each of the battle games for which a check mark has been input is displayed as the total stamina, and the number of tickets required to execute, two times, each of the battle games for which a check mark has been input is displayed as the number of consumed tickets. Then, every time the plus operation section 54g is operated, the number of tickets displayed in the number-of-tickets display field 54e is incremented by one and displayed, and the total stamina and the number of consumed tickets are increased and displayed.

However, in the case where the remaining number of challenges for the hard quest is less than the number of tickets displayed in the number-of-tickets display field 54e, only the amount of stamina corresponding to the remaining number of challenges is added to the total stamina, and the number of tickets corresponding to the remaining number of challenges is added to the number of consumed tickets, for the battle game of the hard quest. For example, as shown in FIG. 11B, in the case where "use four tickets" is displayed in the number-of-tickets display field 54e, the stamina and the number of consumed tickets (a stamina of 40, and a number of consumed tickets of 4) corresponding to four rounds of the battle game "21-1" of the normal quest and the stamina and the number of consumed tickets (a stamina of 60, and a number of consumed tickets of 3) corresponding to three rounds of the battle game "21-2" of the hard quest are summed, whereby the total stamina (100) and the number of consumed tickets (7) are displayed.

Furthermore, every time the minus operation section 54f is operated, the number of tickets displayed in the number-of-tickets display field 54e is decremented by one and displayed, and the total stamina and the number of consumed tickets are decreased and displayed.

After that, for example, in a state in which the quest list pop-up 54 shown in FIG. 11A is displayed, when the collective skip operation section 54h is operated (tapped), the battle game "21-2" of the hard quest and the battle game "21-1" of the normal quest are each treated as being cleared two times, and the skip result pop-up 55, which is shown in FIG. 11C, is displayed on the display 26. In the skip result pop-up 55, items obtained from the two rounds of the battle game "21-2" of the hard quest and the two rounds of the battle game "21-1" of the normal quest are collectively displayed. Note that processing for collectively skipping a plurality of battle games in this way is referred to as collective skip processing.

Here, at the player terminal 1, in the case where the collective skip operation section 54h is operated, the current stamina and the number of tickets owned by the player are referred to, for each of the battle games for which a check mark has been input, and it is determined sequentially from the top whether the battle game can be executed the number of times corresponding to the number of tickets to be consumed. Specifically, in the example case shown in FIG. 11A, although a stamina of 40 and two tickets are consumed to execute the battle game "21-2" of the hard quest two times, if it is assumed that the current stamina is 100 and the player owns 100 tickets, it is determined that the battle game "21-2" of the hard quest can be executed two times. Then, it is determined whether the next battle game "21-1" of the normal quest can be executed two times. Although a stamina of 20 and two tickets are consumed to execute the battle game "21-1" of the normal quest two times, because the remaining stamina is 40 (100−60), and the player owns 98 (100−2) tickets, it is determined that the battle game "21-1" of the normal quest can be executed two times.

Figure 12A:
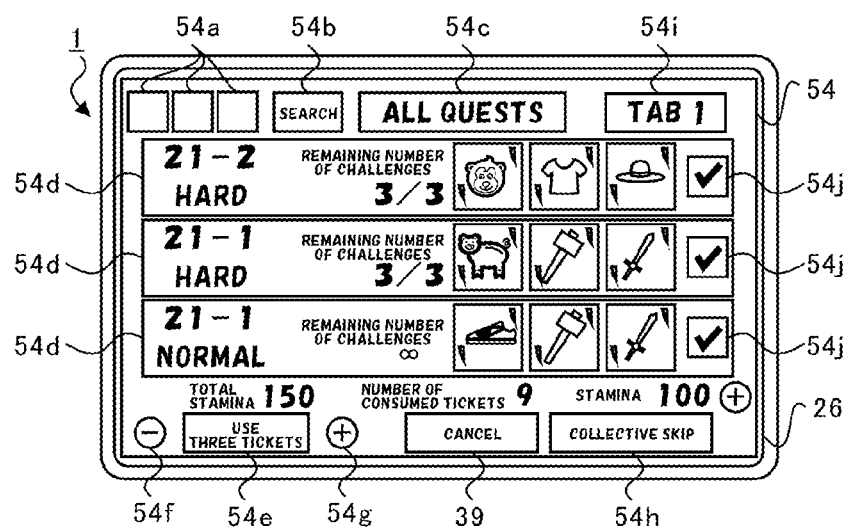
FIG. 12A is a sixth view for explaining an example of the quest list pop-up.
Figure 12B:
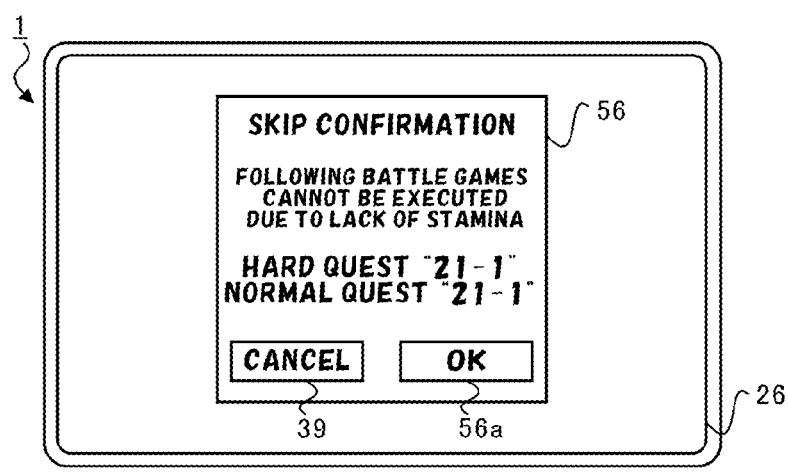
FIG. 12B is a view for explaining an example of a skip confirmation pop-up.
Figure 12C:
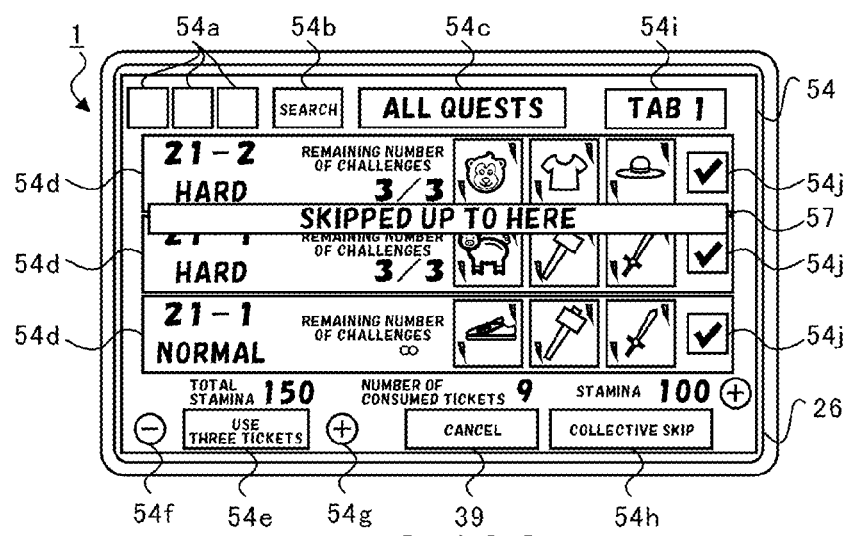
FIG. 12C is a seventh view for explaining an example of the quest list pop-up.

FIG. 12A is a sixth view for explaining an example of the quest list pop-up 54. FIG. 12B is a view for explaining an example of a skip confirmation pop-up 56. FIG. 12C is a seventh view for explaining an example of the quest list pop-up 54.

As shown in FIG. 12A, it is assumed that a check mark has been input in the check-mark input fields 54j for the battle game "21-2" of the hard quest, the battle game "21-1" of the hard quest, and the battle game "21-1" of the normal quest in the battle-game display areas 54d, and "use three tickets" is displayed in the number-of-tickets display field 54e. In the case where the collective skip operation section 54h is operated (tapped) in this state, although a stamina of 60 and three tickets are consumed to execute the battle game "21-2" of the hard quest three times, if it is assumed that the current stamina is 100 and the player owns 100 tickets, it is determined, at the player terminal 1, that the battle game "21-2" of the hard quest can be executed three times. Next, at the player terminal 1, it is determined whether the battle game "21-1" of the hard quest can be executed three times. Although a stamina of 60 and three tickets are consumed to execute the battle game "21-1" of the hard quest three times, because the remaining stamina becomes 40 (100–60), it is determined, at the player terminal 1, that the battle game "21-1" of the hard quest cannot be executed three times. In this way, executability is determined for each battle game for which a check mark has been input, sequentially from the top, and, in the case where there is a battle game that is determined to be non-executable, executability is not determined for battle games displayed below this battle game, and those battle games are all set to be non-executable.

Therefore, in this example case, it is determined that only the battle game "21-2" of the hard quest is executable, and the battle game "21-1" of the hard quest and the battle game "21-1" of the normal quest are non-executable.

In this way, in the case where there are battle games that are determined to be non-executable, the skip confirmation pop-up 56, which is shown in FIG. 12B, is displayed on the display 26. In the skip confirmation pop-up 56, the battle games ("21-1" of the hard quest and "21-1" of the normal quest) that are determined to be non-executable are displayed.

Furthermore, in the skip confirmation pop-up 56, a confirmation operation section 56a, in which "OK" is written, and the cancel operation section 39 are displayed. When the confirmation operation section 56a is operated (tapped), only the battle game that is determined to be executable is treated as being cleared ("21-2" of the hard quest is treated as being cleared three times), the skip result pop-up 55 such as that shown in FIG. 11C is displayed on the display 26. Furthermore, after the skip result pop-up 55 is hidden, a skipped display bar 57 indicating "skipped up to here", for example, is displayed in the quest list pop-up 54 between the battle-game display area 54d of the battle game that has been skipped and the battle-game display areas 54d of the battle games that have not been skipped, as shown in FIG. 12C.

In this way, the battle game that has been skipped and the battle games that have not been skipped are displayed so as to be identifiable by using the skipped display bar 57, whereby the player can instantly confirm which battle game has been skipped.

Furthermore, when the stamina is restored, and the collective skip operation section 54h is operated again, the collective skip processing is performed on the battle games in the battle-game display areas 54d displayed below the skipped display bar 57.

Figure 13A:
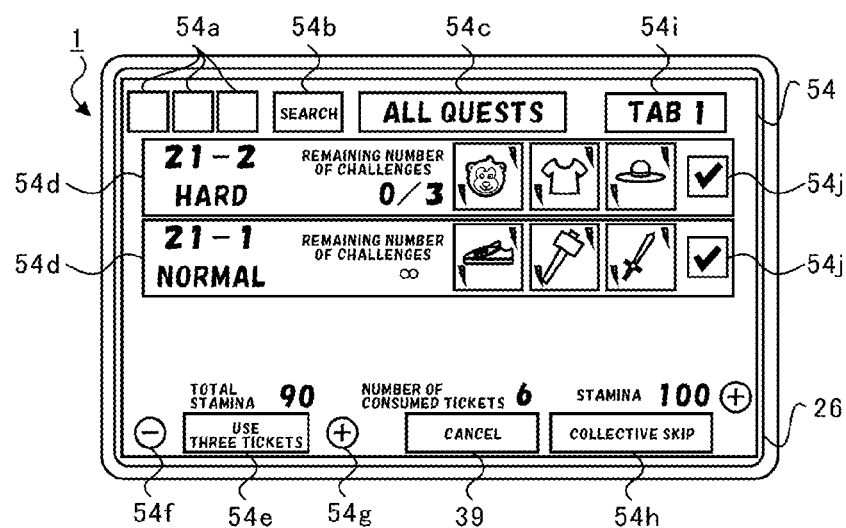
FIG. 13A is an eighth view for explaining an example of the quest list pop-up.
Figure 13B:
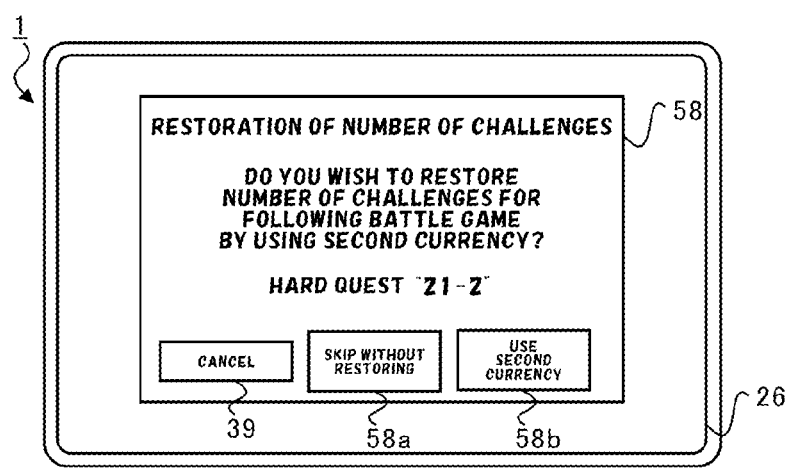
FIG. 13B is a view for explaining an example of a number-of-challenges restoration pop-up.

FIG. 13A is an eighth view for explaining an example of the quest list pop-up 54. FIG. 13B is a view for explaining an example of a number-of-challenges restoration pop-up 58.

As shown in FIG. 13A, in the quest list pop-up 54, it is assumed that the remaining number of challenges for the battle game "21-2" of the hard quest is 0, for example. Furthermore, it is assumed that the remaining number of challenges for the battle game "21-2" of the hard quest has not been restored. Furthermore, it is assumed that a check mark has been input in the check-mark input fields 54j of the battle game "21-2" of the hard quest and the battle game "21-1" of the normal quest.

In this case, when the collective skip operation section 54h is operated, the number-of-challenges restoration pop-up 58, which is shown in FIG. 13B, is displayed on the display 26.

In the number-of-challenges restoration pop-up 58, a message indicating whether the remaining number of challenges for the battle game of the hard quest is restored by using the second currency is displayed, and the cancel operation section 39, a no-restoration skip operation section 58a, and a second-currency-use operation section 58b are provided.

Then, when the no-restoration skip operation section 58a is operated, the collective skip processing is performed on the battle game "21-1" of the normal quest without restoring the remaining number of challenges for the battle game "21-2" of the hard quest.

On the other hand, when the second-currency-use operation section 58b is operated, the remaining number of challenges for the battle game "21-2" of the hard quest is restored by consuming the second currency, and the collective skip processing is performed on the battle game "21-2" of the hard quest and the battle game "21-1" of the normal quest.

Note that, in the quest list pop-up 54, a check mark cannot be input in the check-mark input field 54j of a battle game for which the remaining number of challenges has already been restored once and for which the remaining number of challenges is 0.

Figure 14A:
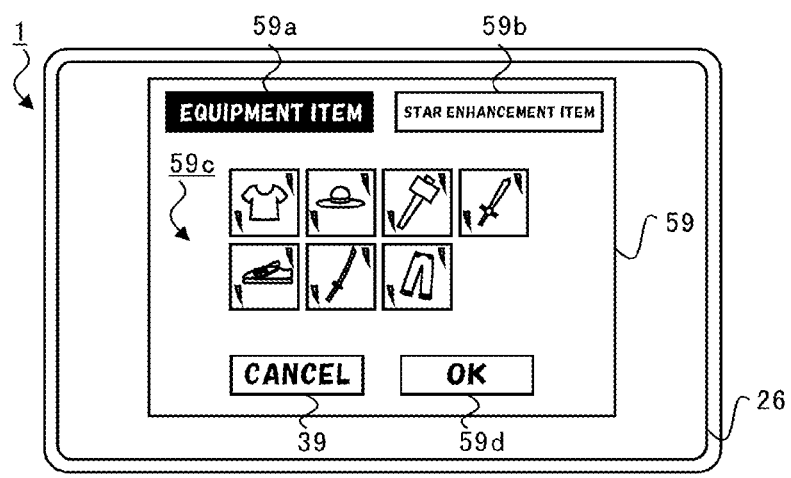
FIG. 14A is a view for explaining an example of an item selection pop-up.
Figure 14B:
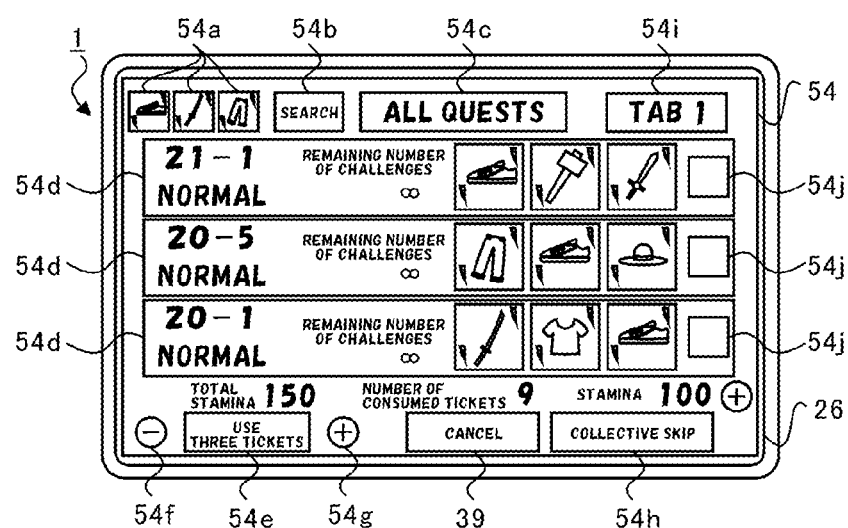
FIG. 14B is a ninth view for explaining an example of the quest list pop-up.

Next, the item selection fields 54a and the search operation section 54b will be described below. FIG. 14A is a view for explaining an example of an item selection pop-up 59. FIG. 14B is a ninth view for explaining an example of the quest list pop-up 54.

In a state in which the quest list pop-up 54 shown in FIG. 10A is displayed on the display 26, for example, when any of the item selection fields 54a is operated (tapped), the item selection pop-up 59, which is shown in FIG. 14A, is displayed on the display 26. In the item selection pop-up 59, an equipment-item selection operation section 59a and a star-enhancement-item selection operation section 59b are provided. Furthermore, an item display area 59c for displaying items is provided in the item selection pop-up 59. Furthermore, the cancel operation section 39 and a selection completion operation section 59d are provided in the item selection pop-up 59.

Either the equipment-item selection operation section 59a or the star-enhancement-item selection operation section 59b is in a state of being selected. In the case where the equipment-item selection operation section 59a is selected, items that can be obtained from battle games in which three stars have been obtained and that are required to create equipment are displayed in a list in the item display area 59c. Furthermore, in the case where the star-enhancement-item selection operation section 59b is selected, items that can be obtained from battle games in which three stars have been obtained and that are required to enhance the number of stars are displayed in a list in the item display area 59c.

The player can select up to three items by operating (tapping) some of the items displayed in the item display area 59c. When the selection completion operation section 59d is operated in a state in which some of the items displayed in the item display area 59c have been selected, these items selected in the item display area 59c are displayed in the item selection fields 54a, as shown in FIG. 14B. Then, when the search operation section 54b is operated (tapped) with these items being displayed in the item selection fields 54a, the battle-game display areas 54d of the battle games from which these items displayed in the item selection fields 54a can be obtained are displayed.

In this way, the player merely selects desired items and operates (taps) the search operation section 54b, whereby the battle games from which these items desired by the player can be obtained are displayed in a list in the battle-game display areas 54*d*. Then, a check mark is input in the check-mark input field(s) 54*j* of the battle game(s) to be skipped, and the number of times of execution of the battle game(s) is selected, whereby it is possible to skip the selected number of times of execution of the one or a plurality of battle games for each of which a check mark has been input. Accordingly, it is possible to easily collect items and to save time and effort of the player.

Figure 15A:
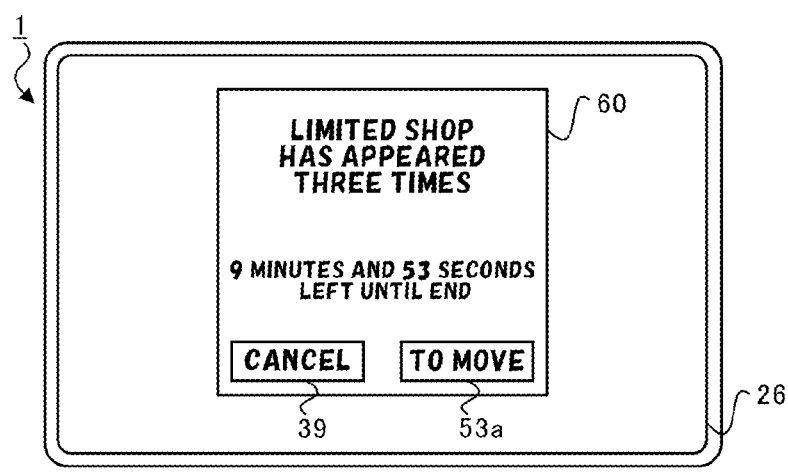
FIG. 15A is a view for explaining an example of a limited-shop appearance pop-up.
Figure 15B:
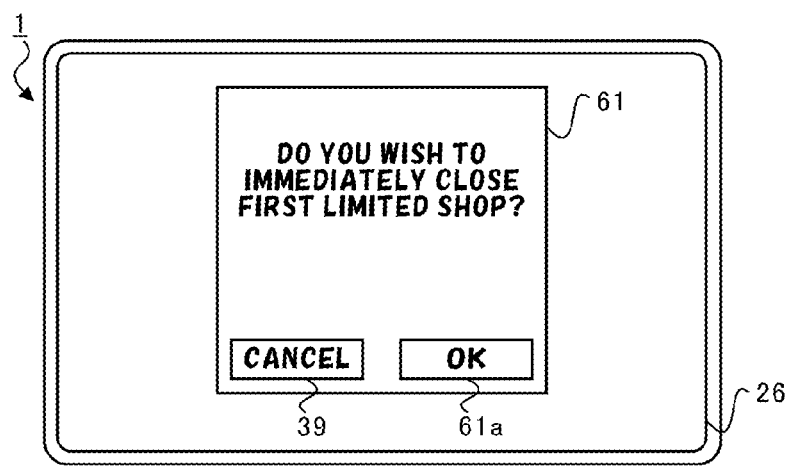
FIG. 15B is a view for explaining an example of a reset confirmation pop-up.

FIG. 15A is a view for explaining an example of a limited-shop appearance pop-up 60. FIG. 15B is a view for explaining an example of a reset confirmation pop-up 61. Even in the case where the collective skip processing is performed, the server 100 performs a lottery to determine whether the limited shop is made to appear. Here, in the case where the collective skip processing is performed, because the battle game(s) is/are treated as being cleared a plurality of times, the server 100 performs a lottery to determine whether the limited shop is made to appear, the corresponding number of times. For example, in the case where the collective skip processing is performed for 30 rounds of execution of battle game(s), the server 100 performs a lottery to determine whether the limited shop is made to appear, up to 30 times. Specifically, when a lottery is won until the number of times to open the limited shop reaches five (upper limit value), the server 100 refers to the limited-shop lottery table, which is shown in FIG. 9, and performs a lottery sequentially from a winning probability of 10% again. Then, when the number of times to open has reached five, the server 100 does not perform the subsequent lottery. Note that, in the case where a battle game is treated as being cleared by consuming a plurality of tickets in the quest detail screens, which are shown in FIG. 5B and FIG. 7B, it is also possible to perform a lottery to determine whether the limited shop is made to appear, until the number of times to open reaches five, as in the case of the collective skip processing.

Then, the server 100 performs a lottery while referring to the limited-shop lottery table, which is shown in FIG. 9, and, when the lottery is won, the server 100 performs a lottery again the remaining number of times while referring to the limited-shop lottery table. Therefore, in the case where the collective skip function is used, a plurality of lotteries are won in some cases.

In this case, at the player terminal 1, the limited-shop appearance pop-up 60, which is shown in FIG. 15A, is displayed on the display 26. In the limited-shop appearance pop-up 60, the results of a plurality of lotteries are collectively displayed. Specifically, in the limited-shop appearance pop-up 60, the fact that the limited shop has appeared (has been opened) and the number of times to open the limited shop (the number of wins, here, three) are displayed. Note that, in the limited-shop appearance pop-up 60, it is also possible to display only the fact that the limited shop has been opened and not to display the number of times to open the limited shop (the number of wins).

Then, when the limited-shop operation section 53*a* is operated, the limited shop screen shown in FIG. 8C is displayed. After that, when the immediate-close operation section 52*e* is operated, the reset confirmation pop-up 61, which is shown in FIG. 15B, is displayed on the display 26. Then, when a confirmation operation section 61*a* in the reset confirmation pop-up 61 is operated, the shop screen for the next limited shop is displayed on the display 26.

Note that, when 10 minutes have elapsed while the immediate-close operation section 52*e* has not been operated, the next limited shop appears. In such a case, the shop-screen operation section 33*a* is operated from the home screen, which is shown in FIG. 3A, thereby making it possible to display the shop screen for the limited shop.

In this way, in the case where multiple rounds of the battle game(s) are collectively skipped, a lottery for determining whether the limited shop is made to appear is performed the corresponding number of times, and the result thereof is displayed, thereby avoiding a situation in which, in the case where multiple rounds of the battle game(s) are collectively skipped, the limited shop does not appear multiple times and preventing the player from having a sense of losing out.

Next, basic configurations and communication processing of the player terminal 1 and the server 100 for executing the collective skip processing will be described below. Note that an example of basic communication processing for proceeding with a game and an example of main communication processing related to the collective skip processing will be described here, and a description of the other processing will be omitted.

(Functional Configuration of Player Terminal 1)

Figure 16:
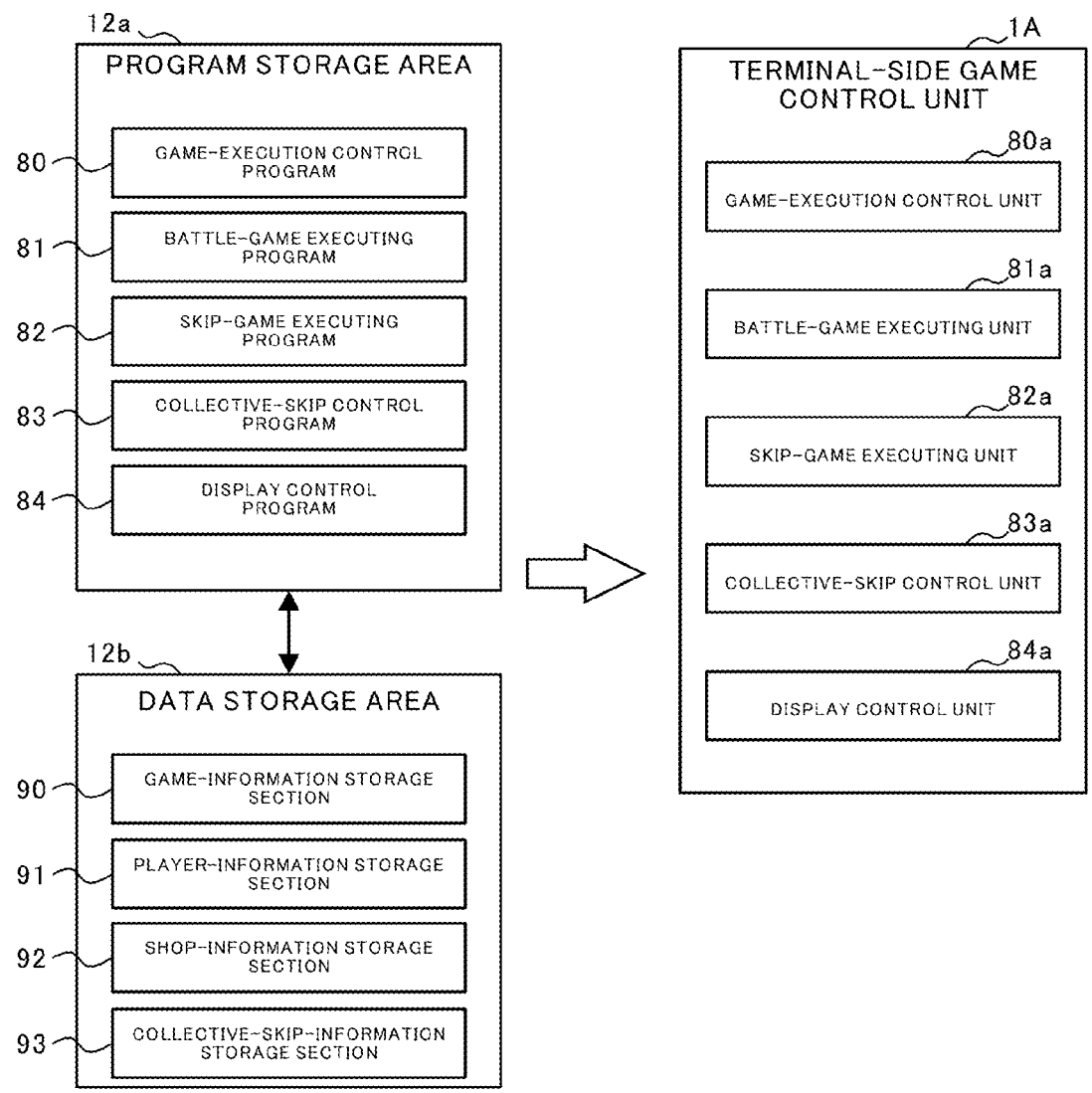
FIG. 16 is a diagram for explaining the configuration of a memory at the player terminal and the function of the player terminal serving as a computer.

FIG. 16 is a diagram for explaining the configuration of the memory 12 at the player terminal 1 and the function of the player terminal 1 serving as a computer. In the memory 12, a program storage area 12*a* and a data storage area 12*b* are provided. When a game is started, the CPU 10 stores terminal-side game control programs (modules) in the program storage area 12*a*.

The terminal-side game control programs include a game-execution control program 80, a battle-game executing program 81, a skip-game executing program 82, a collective-skip control program 83, and a display control program 84. Note that the programs listed in FIG. 16 are merely examples, and a large number of other programs are also provided as the terminal-side game control programs.

In the data storage area 12*b*, a game-information storage section 90, a player-information storage section 91, a shop-information storage section 92, and a collective-skip-information storage section 93 are provided as storage sections for storing data. Note that the above-mentioned storage sections are merely examples, and a large number of other storage sections are also provided in the data storage area 12*b*.

The CPU 10 runs the individual programs stored in the program storage area 12*a* and updates data in the individual storage sections of the data storage area 12*b*. Then, the CPU 10 runs the individual programs stored in the program storage area 12*a*, thereby causing the player terminal 1 (computer) to function as a terminal-side game control unit 1A. The terminal-side game control unit 1A includes a game-execution control unit 80*a*, a battle-game executing unit 81*a*, a skip-game executing unit 82*a*, a collective-skip control unit 83*a*, and a display control unit 84*a*.

Specifically, the CPU 10 runs the game-execution control program 80, thereby causing the computer to function as the game-execution control unit 80*a*. Similarly, the CPU 10 runs the battle-game executing program 81, the skip-game executing program 82, the collective-skip control program 83, and the display control program 84, thereby causing the computer to function as the battle-game executing unit 81*a*, the skip-game executing unit 82*a*, the collective-skip control unit 83*a*, and the display control unit 84*a*, respectively.

The game-execution control unit 80*a* controls the proceeding of the entire game. The game-execution control unit 80*a* sends login information to the server 100 at the time of logging in, for example. Furthermore, the game-execution control unit 80*a* performs control related to transition of the normal screens. Furthermore, in the case where game information about the whole game is updated, the game-execution control unit 80a receives the game information from the server 100 and stores the game information in the game-information storage section 90.

The battle-game executing unit 81a takes charge of control of the execution of battle games. For example, the battle-game executing unit 81a updates the battle screen, controls actions of ally characters and enemy characters, and derives damage points, on the basis of operations input to the player terminal 1.

The skip-game executing unit 82a takes charge of control when a battle game is skipped by consuming a ticket.

The collective-skip control unit 83a stores information related to the collective skip processing in the collective-skip-information storage section 93 and takes charge of control related to the collective skip processing.

The display control unit 84a generates a screen to be displayed on the display 26 and displays the generated screen on the display 26.

(Functional Configuration of Server 100)

Figure 17:
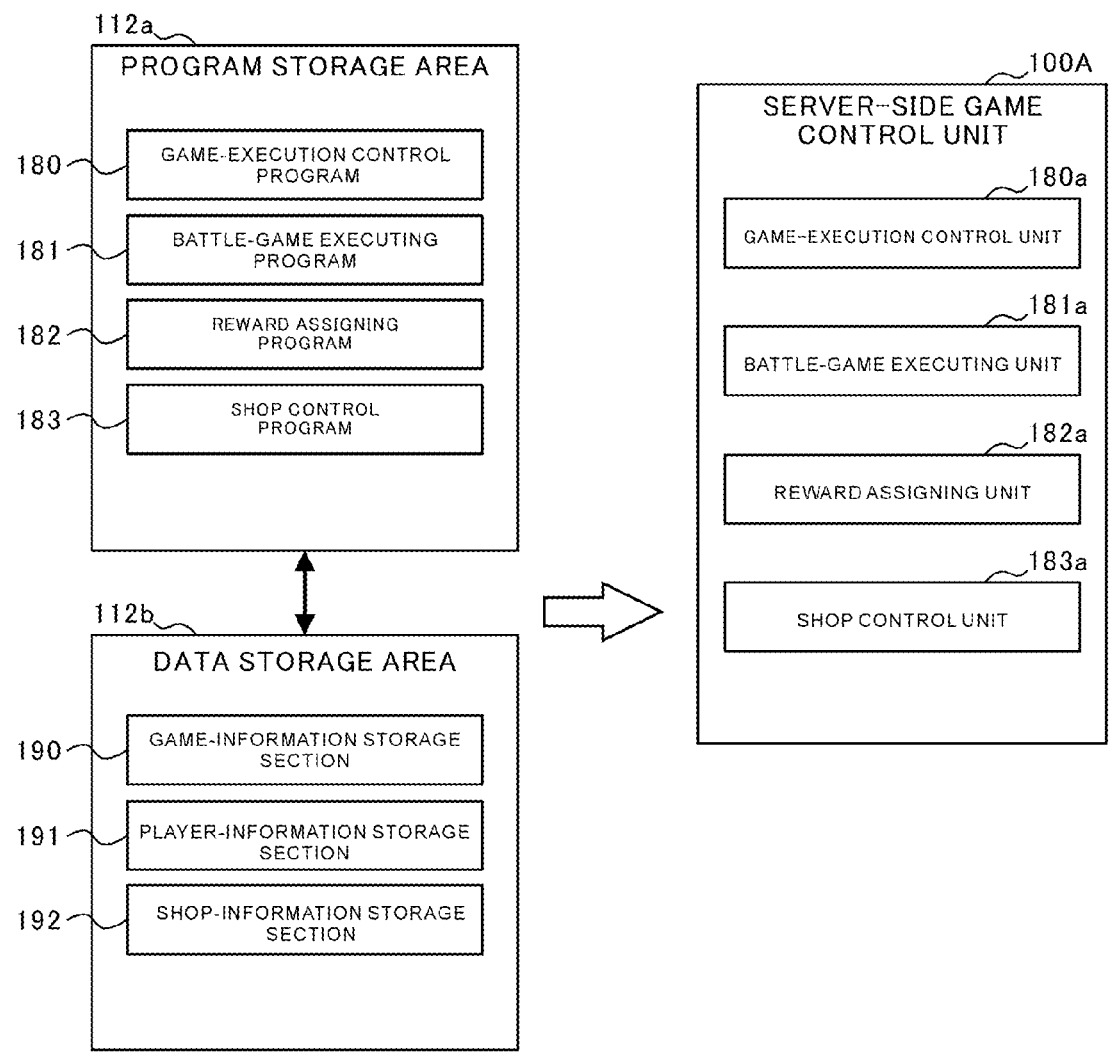
FIG. 17 is a diagram for explaining the configuration of a memory at the server and the function of the server serving as a computer.

FIG. 17 is a diagram for explaining the configuration of the memory 112 at the server 100 and the function of the server 100 serving as a computer. In the memory 112, a program storage area 112a and a data storage area 112b are provided. When a game is started, the CPU 110 stores server-side game control programs (modules) in the program storage area 112a.

The server-side game control programs include a game-execution control program 180, a battle-game executing program 181, a reward assigning program 182, and a shop control program 183. Note that the programs listed in FIG. 17 are merely examples, and a large number of other programs are also provided as the server-side game control programs.

In the data storage area 112b, a game-information storage section 190, a player-information storage section 191, and a shop-information storage section 192 are provided as storage sections for storing data. Note that the above-mentioned storage sections are merely examples, and a large number of other storage sections are also provided in the data storage area 112b.

The CPU 110 runs the individual programs stored in the program storage area 112a and updates data in the individual storage sections of the data storage area 112b. Then, the CPU 110 runs the individual programs stored in the program storage area 112a, thereby causing the server 100 to function as a server-side game control unit 100A. The server-side game control unit 100A includes a game-execution control unit 180a, a battle-game executing unit 181a, a reward assigning unit 182a, and a shop control unit 183a.

Specifically, the CPU 110 runs the game-execution control program 180, thereby causing the computer to function as the game-execution control unit 180a. Similarly, the CPU 110 runs the battle-game executing program 181, the reward assigning program 182, and the shop control program 183, thereby causing the computer to function as the battle-game executing unit 181a, the reward assigning unit 182a, and the shop control unit 183a, respectively.

The game-execution control unit 180a controls the proceeding of the entire game. When login information, for example, is received from the player terminal 1, the game-execution control unit 180a sends player information stored in the player-information storage section 191 to the player terminal 1. Furthermore, in the case where game information about the whole game is updated, the game-execution control unit 180a reads the updated game information from the game-information storage section 190 and sends the game information to the player terminal 1.

The battle-game executing unit 181a takes charge of control of the execution of battle games.

The reward assigning unit 182a assigns rewards to the player. The reward assigning unit 182a assigns, to the player who has cleared a battle game, items corresponding to the cleared battle game. More specifically, the reward assigning unit 182a adds items to be assigned, to the player information corresponding to the player ID of the player who has cleared a battle game, and stores the items in the player-information storage section 191.

The shop control unit 183a determines the content of the normal shop and stores the determined content in the shop-information storage section 192. Furthermore, in the case where a battle game is cleared, the shop control unit 183a determines by lottery whether the limited shop is made to appear and, in the case where the lottery is won, stores the number of times to open the limited shop, the content thereof, and the termination condition in the shop-information storage section 192.

(Communication Processing Between Player Terminal 1 and Server 100)

Figure 18:
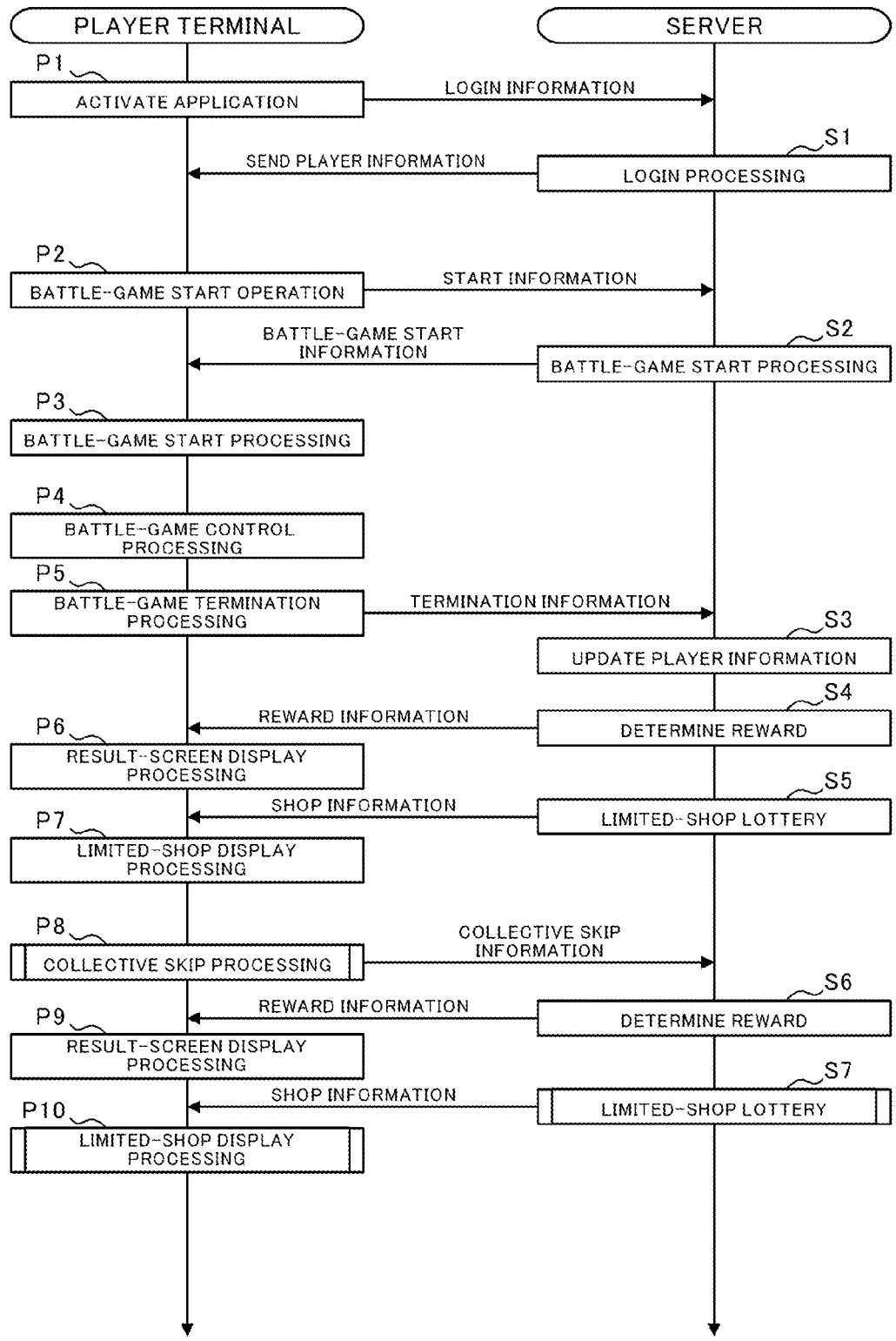
FIG. 18 is a sequence diagram for explaining basic processing at the player terminal and the server.

FIG. 18 is a sequence diagram for explaining basic processing at the player terminal 1 and the server 100. Note that, in the following description, processing at the player terminal 1 is indicated by Pn (n is an arbitrary integer). Furthermore, processing at the server 100 is indicated by Sn (n is an arbitrary integer). At the player terminal 1, when the player activates a game application (P1), the game-execution control unit 80a sends login information to the server 100. When the login information is received, the game-execution control unit 180a of the server 100 identifies the player ID associated with the login information to perform login processing (S1). Here, the game-execution control unit 180a reads player information corresponding to the identified player ID from the player-information storage section 191 and sends the player information to the player terminal 1.

Furthermore, it is assumed that a battle-game start operation is performed at the player terminal 1 (P2). In this case, start information is sent from the player terminal 1 to the server 100. Note that the start information includes party information selected by the player, battle-game classification information, etc. At the server 100, upon reception of the start information, battle-game start information needed to start a battle game is sent to the player terminal 1 (S2). Then, when the battle-game start information is received, the battle-game executing unit 81a of the player terminal 1 performs battle-game start processing for starting the battle game (P3). Here, for example, an area of the memory 12 for proceeding with the battle game is allocated, and a predetermined program is loaded from the storage unit 18 into the memory 12.

After that, the battle-game executing unit 81a of the player terminal 1 performs battle-game control processing for controlling the battle game (P4). In the battle-game control processing, update processing for updating various kinds of information is repeatedly executed on a per-frame basis. Note that the number of frames is not particularly limited; for example, the number of frames per second is 30 to 60. Thus, during the battle game, information is updated at intervals of about 16 milliseconds (ms) to 33 ms at the player terminal 1.

Then, when a termination condition for the battle game is established, the battle-game executing unit 81a of the player terminal 1 performs battle-game termination processing for terminating the battle game (P5). In the battle-game termination processing, for example, game result information (termination information) is sent to the server 100. When the game result information is obtained, the battle-game executing unit 181a of the server 100 updates the player information (S3). Note that, in the case where a battle game is started by using a ticket, the skip-game executing unit 82a skips the battle-game start processing (P3) and the battle-game control processing (P4) and executes the battle-game termination processing (P5) while treating the battle game as being cleared.

Furthermore, in the case where the battle game is cleared, the reward assigning unit 182a determines items corresponding to the cleared battle game on the basis of the game result information and assigns the items (S4). Then, the reward assigning unit 182a sends, to the player terminal 1, information about the assigned items as reward information. The display control unit 84a of the player terminal 1 displays a result screen on the display 26 on the basis of the reward information (P6).

The shop control unit 183a determines by lottery whether the limited shop is made to appear (S5). Furthermore, in the case where it is determined that the limited shop is made to appear, the shop control unit 183a determines the content of the limited shop and the termination condition therefor and stores the number of times to open the limited shop, the content, and the termination condition in the shop-information storage section 192. Furthermore, the shop control unit 183a sends shop information indicating the number of times to open the limited shop, the content, and the termination condition to the player terminal 1. When the shop information is received, the game-execution control unit 80a of the player terminal 1 stores the number of times to open the limited shop, the content, and the termination condition, which are indicated in the shop information, in the shop-information storage section 92. Furthermore, the display control unit 84a displays the limited-shop appearance pop-up 53 on the display 26 (P7).

Furthermore, when the quest list operation section 43 is operated in the quest display screens, which are shown in FIG. 5A and FIG. 7A, the collective-skip control unit 83a executes collective skip processing (P8).

Figure 19:
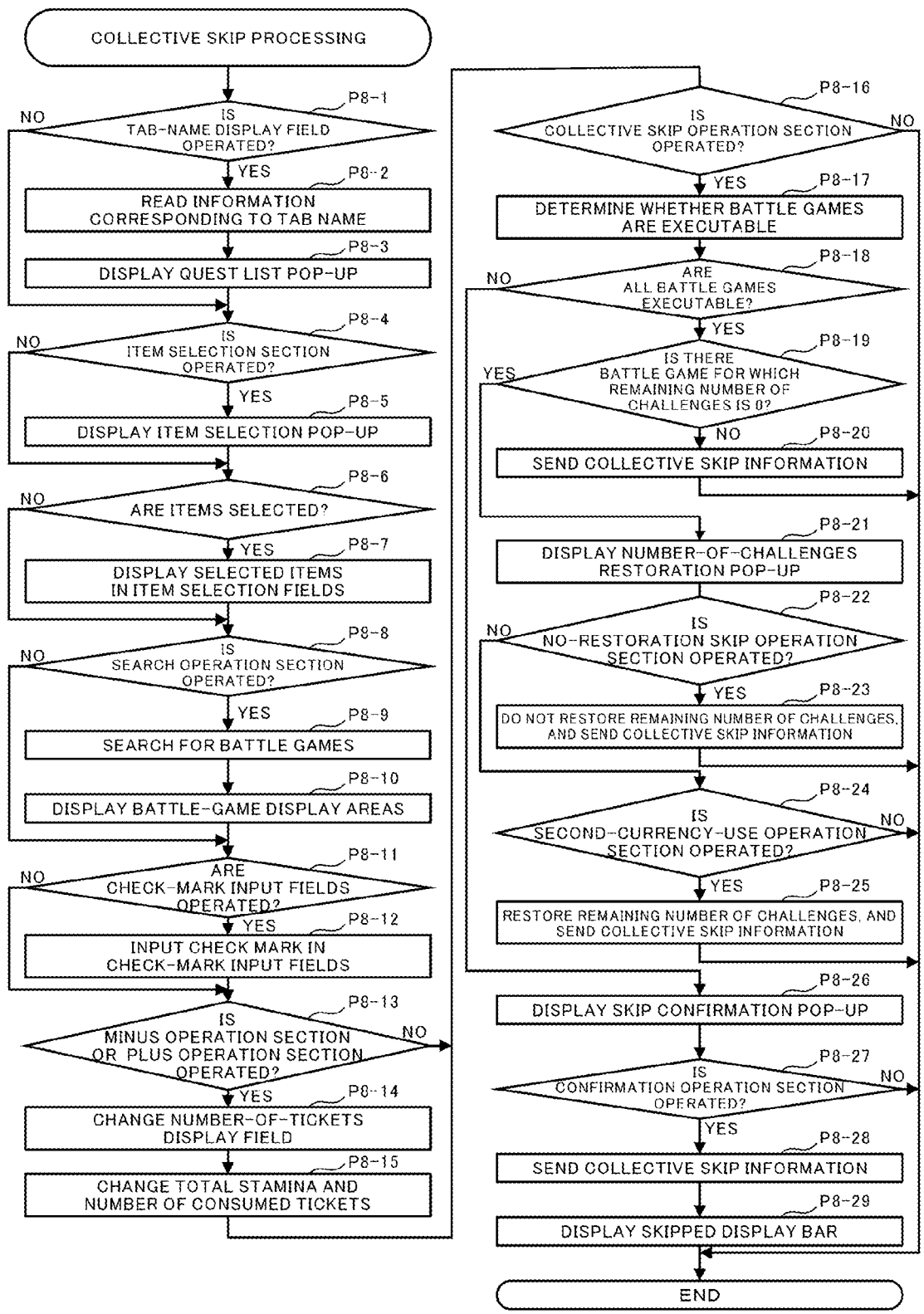
FIG. 19 is a flowchart for explaining collective skip processing.

FIG. 19 is a flowchart for explaining the collective skip processing. As shown in FIG. 19, when the tab-name display field 54i is operated (YES in P8-1), the collective-skip control unit 83a reads information corresponding to the operated tab name from the collective-skip-information storage section 93 (P8-2). The display control unit 84a displays the quest list pop-up 54 on the display 26 in accordance with a read collective skip list (P8-3).

Furthermore, when any of the item selection fields 54a is operated (tapped) (YES in P8-4), the display control unit 84a displays the item selection pop-up 59, which is shown in FIG. 14A, on the display 26 (P8-5). Then, in the state in which some of the items displayed in the item display area 59c are selected, when the selection completion operation section 59d is operated (YES in P8-6), the display control unit 84a displays the items selected in the item display area 59c, in the item selection fields 54a (P8-7). Furthermore, the collective-skip control unit 83a stores the selected items in the collective-skip-information storage section 93 in correspondence with the tab name.

After that, when the search operation section 54b is operated (tapped) (YES in P8-8), the collective-skip control unit 83a searches for battle games from which the items displayed in the item selection fields 54a can be obtained (P8-9), and the display control unit 84a displays the battle-game display areas 54d of the found battle games (P8-10).

Furthermore, when the check-mark input fields 54j of the battle-game display areas 54d are operated (YES in P8-11), the display control unit 84a displays check marks in the operated check-mark input fields 54j (P8-12). Furthermore, the collective-skip control unit 83a stores the battle games for which a check mark has been input, in the collective-skip-information storage section 93 in correspondence with the tab name and sends this information to the server 100.

Furthermore, when the minus operation section 54f or the plus operation section 54g is operated (YES in P8-13), the display control unit 84a changes the indication of the number-of-tickets display field 54e in accordance with the operation (P8-14). Furthermore, the display control unit 84a changes and displays the total stamina and the number of consumed tickets in accordance with the operation (P8-15). Furthermore, the collective-skip control unit 83a stores the changed number of tickets in the collective-skip-information storage section 93 in correspondence with the tab name and sends this information to the server 100.

When the collective skip operation section 54h is operated (YES in P8-16), the collective-skip control unit 83a determines sequentially from above whether the battle games for which a check mark has been input in the check-mark input fields 54j are executable (P8-17).

In the case where all the battle games for which a check mark has been input in the check-mark input fields 54j are executable (YES in P8-18), and, when there is no battle game for which the remaining number of challenges is 0 (NO in P8-19), the collective-skip control unit 83a sends collective skip information that indicates the hierarchies of all those battle games and the number of times of execution thereof, to the server 100 (P8-20).

On the other hand, when there is a battle game for which the remaining number of challenges is 0 (YES in P8-19), the display control unit 84a displays the number-of-challenges restoration pop-up 58, which is shown in FIG. 13B, on the display 26 (P8-21). Then, when the no-restoration skip operation section 58a is operated (YES in P8-22), the collective-skip control unit 83a does not restore the remaining number of challenges for the battle game and sends collective skip information that indicates the hierarchies of the battle games for which the remaining number of challenges is other than 0 and the number of times of execution thereof, to the server 100 (P8-23).

Furthermore, when the second-currency-use operation section 58b is operated (YES in P8-24), the collective-skip control unit 83a restores the remaining number of challenges for the battle game and sends collective skip information that indicates the hierarchies of all those battle games and the number of times of execution thereof, to the server 100 (P8-25).

Furthermore, in the case where all the battle games for which a check mark has been input in the check-mark input fields 54j are not executable (NO in P8-18), the display control unit 84a displays, on the display 26, the skip confirmation pop-up 56, which is shown in FIG. 12B, for the battle game that is not executable (P8-26).

Then, when the confirmation operation section 56a is operated (YES in P8-27), collective skip information that indicates the hierarchies of the battle games that are determined to be executable and the number of times of execution thereof is sent to the server 100 (P8-28). Furthermore, the display control unit 84a displays the skipped display bar 57, which indicates "skipped up to here", for example, between the battle-game display area 54d of the battle game that has been skipped and the battle-game display area 54*d* of the battle game that has not been skipped (P8-29).

Returning to FIG. 18, when the collective skip information is received, the reward assigning unit 182*a* determines and assigns items corresponding to the number of times of execution of all those battle games, on the basis of the collective skip information (S6). Then, the reward assigning unit 182*a* sends, as reward information, information about the assigned items to the player terminal 1. The display control unit 84*a* of the player terminal 1 displays the result screen on the display 26 on the basis of the reward information (P9).

The shop control unit 183*a* determines by lottery whether the limited shop is made to appear, on the basis of the collective skip information (S7).

Figure 20:
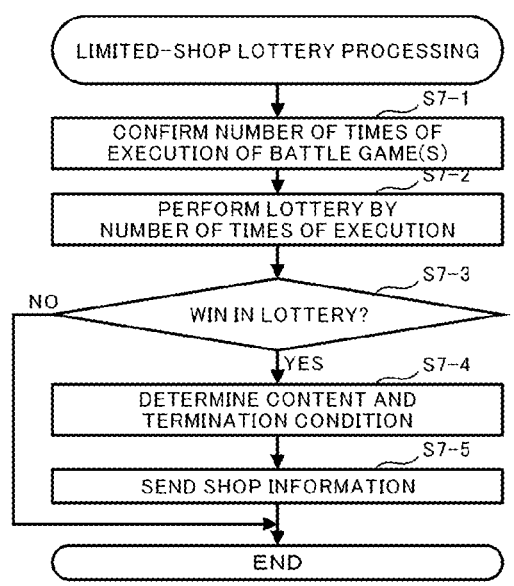
FIG. 20 is a flowchart for explaining an example of limited-shop lottery processing.

FIG. 20 is a flowchart for explaining limited-shop lottery processing. The shop control unit 183*a* confirms the number of times of execution of the battle game(s) on the basis of the collective skip information (S7-1). Then, the shop control unit 183*a* refers to the limited-shop lottery table, which is shown in FIG. 9, and performs a lottery the confirmed number of times of execution (S7-2).

After that, in the case of winning in the lottery (YES in S7-3), the shop control unit 183*a* determines the content of the limited shop and the termination condition, for the number of times of winning in the lottery (S7-4). Then, the shop control unit 183*a* sends shop information that indicates the content of the limited shop and the termination condition to the player terminal 1 (S7-5).

Returning to FIG. 18, when the shop information is received, the display control unit 84*a* performs limited-shop display processing (P10).

Figure 21:
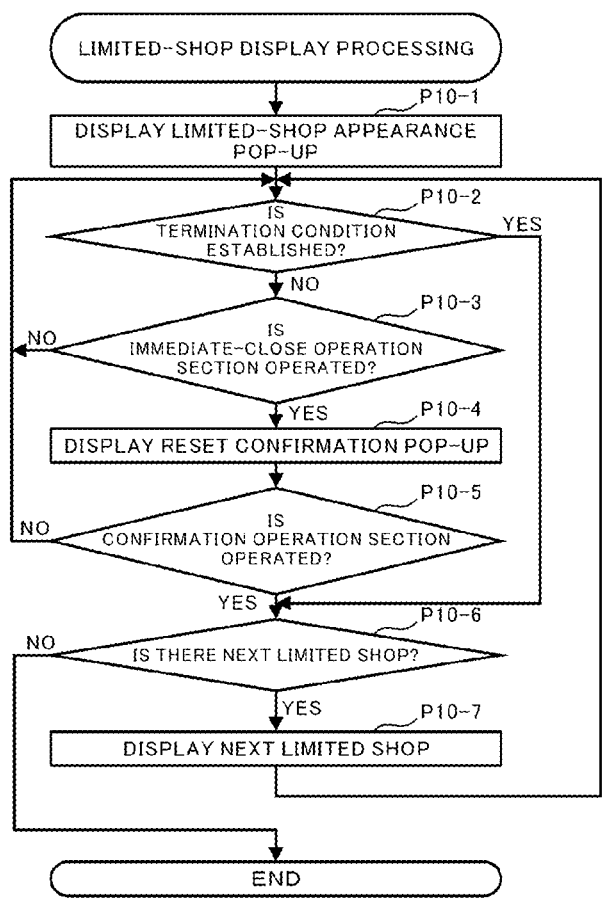
FIG. 21 is a flowchart for explaining an example of limited-shop display processing.

FIG. 21 is a flowchart showing the limited-shop display processing. When the shop information is received, the display control unit 84*a* displays the limited-shop appearance pop-up 60, which is shown in FIG. 15A, on the display 26 (P10-1).

Then, before the termination condition is established (NO in P10-2), when the immediate-close operation section 52*e* is operated (YES in P10-3), the display control unit 84*a* displays the reset confirmation pop-up 61, which is shown in FIG. 15B, on the display 26 (P10-4).

Furthermore, when the termination condition is established (YES in P10-2) or when the confirmation operation section 61*a* is operated (YES in P10-5), if there is a next limited shop (YES in P10-6), the display control unit 84*a* displays the shop screen for the next limited shop on the display 26 (P10-7).

As described above, the player terminal 1 has the game-execution control program 80, the battle-game executing program 81, the skip-game executing program 82, the collective-skip control program 83, and the display control program 84 provided therein. Furthermore, the player terminal 1 includes the game-execution control unit 80*a*, the battle-game executing unit 81*a*, the skip-game executing unit 82*a*, the collective-skip control unit 83*a*, and the display control unit 84*a*. However, a portion or the entirety of these programs and functional units may be provided at the server 100.

Furthermore, the server 100 has the game-execution control program 180, the battle-game executing program 181, the reward assigning program 182, and the shop control program 183 provided therein. Furthermore, the server 100 includes the game-execution control unit 180*a*, the battle-game executing unit 181*a*, the reward assigning unit 182*a*, and the shop control unit 183*a*. However, a portion or the entirety of these programs and functional units may be provided at the player terminal 1.

Furthermore, in the above-described embodiment, the shop control unit 183*a*, which serves as a lottery unit, determines by lottery whether the limited shop is made to appear when a battle game is cleared. However, the lottery unit may open predetermined content when a battle game is cleared. Here, the predetermined content may be, for example, another battle game, or may be a period of time that becomes advantageous to the player, such as a period of time during which at least one of experience points and an item that can be obtained is doubled.

Furthermore, in the above-described embodiment, the shop control unit 183*a*, which serves as the lottery unit, determines by lottery whether the limited shop is made to appear (whether the content is opened) when a battle game is cleared. However, the lottery unit may determine by lottery whether an item for opening the content is assigned, for example, when a battle game is cleared. That is, the lottery unit may perform a lottery regarding the opening of predetermined content.

Furthermore, in the above-described embodiment, although a battle game using a ticket is omitted in its entirety, it is just necessary to omit at least a portion of the function of a game, and, for example, it is also possible to automatically execute a battle game without the player performing an operation, to reduce the number of enemy characters, or to make enemy characters weak.

Furthermore, the programs in the above-described embodiment may be stored in a computer-readable recording medium and provided in the form of the recording medium. Alternatively, the programs in the above-described embodiment may be provided in the form of a player terminal or an information processing system that includes this recording medium. Furthermore, the above-described embodiment may be an information processing method for realizing the individual functions and the steps shown in the flowcharts.

Although an aspect of the embodiment has been described above with reference to the accompanying drawings, it goes without saying that the present invention is not limited to the embodiment described above. It would be obvious that a person skilled in the art could conceive of various modifications and amendments within the scope recited in the claims, and it will be understood that those modifications and amendments obviously belong to the technical scope of the present invention.

What is claimed is:

1. A non-transitory computer readable medium storing a program causing a computer to execute a method comprising:
   executing a first computer game among a plurality of computer games based on an operation of a player, wherein the plurality of computer games are executed using a player terminal communicating with a server over a communication network;
   assigning a first reward among a plurality of rewards to the player in response to the first computer game being cleared;
   displaying, using a display device, a first game screen comprising an item selection pop-up in which the player selects one or more rewards among a plurality of assigned rewards including the first reward after the first reward is assigned to the player in response to clearing the first computer game;

obtaining, from a touchscreen connected to the player terminal, a selection of rewards including the one or more rewards selected by the player in the first game screen;

searching a first portion of the plurality of computer games based on the selection,
  wherein each computer game among the first portion of the plurality of computer games comprises at least one of the one or more rewards selected by the player in the first game screen, and
  wherein each computer game among the first portion of the plurality of computer games comprises a skip function that can omit at least a part of a plurality of game functions;

displaying, using the display device, a second game screen comprising a quest list pop-up, wherein the second game screen shows the first portion of the plurality of computer games that have been searched and in which the player can select a second portion of the plurality of computer games that are among the first portion of plurality of computer games; and collectively executing, using the player terminal and the server, a plurality of skip functions of the second portion of the plurality of computer games selected by the player in the second game screen.

2. The non-transitory computer readable medium according to claim 1,
  wherein a plurality of stamina values are required for executing and are set for the plurality of computer games, and
  wherein the plurality of skip functions are collectively executed so that a sum of the plurality of stamina values of the second portion of plurality of computer games does not exceed a stamina value that the player has.

3. The non-transitory computer readable medium according to claim 2, wherein the method further comprises:
  distinguishably displaying, in response to a part of the plurality of skip functions has not been executed, at least one computer game of which a skip function has been executed and at least one computer game of which a skip function has not been executed, among the second portion of the plurality of computer games.

4. An information processing method comprising steps of:
executing a first computer game among a plurality of computer games based on an operation of a player,
  wherein the plurality of computer games are executed using a player terminal communicating with a server over a communication network;
assigning a first reward among a plurality of rewards to the player in response to the first computer game being cleared;
displaying, using a display device, a first game screen comprising an item selection pop-up in which the player selects one or more rewards among a plurality of assigned rewards including the first reward after the first reward is assigned to the player in response to clearing the first computer game;
obtaining, from a touchscreen connected to the player terminal, a selection of rewards including the one or more rewards selected by the player in the first game screen;
searching a first portion of the plurality of computer games based on the selection,
  wherein each computer game among the first portion of the plurality of computer games comprises at least one of the one or more rewards selected by the player in the first game screen, and
  wherein each computer game among the first portion of the plurality of computer games comprises a skip function that can omit at least a part of a plurality of game functions;
displaying, using the display device, a second game screen comprising a quest list pop-up, wherein the second game screen shows the first portion of the plurality of computer games that have been searched and in which the player can select a second portion of the plurality of computer games that are among the first portion of plurality of computer games; and
collectively executing, using the player terminal and the server, a plurality of skip functions of the second portion of the plurality of computer games selected by the player in the second game screen.

5. An information processing device comprising a computer configured to execute a method comprising:
executing a first computer game among a plurality of computer games based on an operation of a player,
  wherein the plurality of computer games are executed using a player terminal communicating with a server over a communication network;
assigning a first reward among a plurality of rewards to the player in response to the first computer game being cleared;
displaying, using a display device, a first game screen comprising an item selection pop-up in which the player selects one or more rewards among a plurality of assigned rewards including the first reward after the first reward is assigned to the player in response to clearing the first computer game;
obtaining, from a touchscreen connected to the player terminal, a selection of rewards including the one or more rewards selected by the player in the first game screen;
searching a first portion of the plurality of computer games based on the selection,
  wherein each computer game among the first portion of the plurality of computer games comprises at least one of the one or more rewards selected by the player in the first game screen, and
  wherein each computer game among the first portion of the plurality of computer games comprises a skip function that can omit at least a part of a plurality of game functions;
displaying, using the display device, a second game screen comprising a quest list pop-up, wherein the second game screen shows the first portion of the plurality of computer games that have been searched and in which the player can select a second portion of the plurality of computer games that are among the first portion of plurality of computer games; and
collectively executing, using the player terminal and the server, a plurality of skip functions of the second portion of the plurality of computer games selected by the player in the second game screen.

6. An information processing system comprising a player terminal and a server configured to collaboratively execute a method comprising:
executing a first computer game among a plurality of computer games based on an operation of a player,
  wherein the plurality of computer games are executed using the player terminal communicating with the server over a communication network;
assigning a first reward among a plurality of rewards to the player in response to the first computer game being cleared;

displaying, using a display device, a first game screen comprising an item selection pop-up in which the player selects one or more rewards among a plurality of assigned rewards including the first reward after the first reward is assigned to the player in response to clearing the first computer game;

obtaining, from a touchscreen connected to the player terminal, a selection of rewards including the one or more rewards selected by the player in the first game screen;

searching a first portion of the plurality of computer games based on the selection,
wherein each computer game among the first portion of the plurality of computer games comprises at least one of the one or more rewards selected by the player in the first game screen, and
wherein each computer game among the first portion of the plurality of computer games comprises a skip function that can omit at least a part of a plurality of game functions;

displaying, using the display device, a second game screen comprising a quest list pop-up, wherein the second game screen shows the first portion of the plurality of computer games that have been searched and in which the player can select a second portion of the plurality of computer games that are among the first portion of plurality of computer games; and collectively executing, using the player terminal and the server, a plurality of skip functions of the second portion of the plurality of computer games selected by the player in the second game screen.

7. A non-transitory computer readable medium storing a program causing a computer to execute a method comprising:

executing a first computer game among a plurality of computer games based on an operation of a player,
wherein the plurality of computer games are executed using a player terminal communicating with a server over a communication network;

assigning a first reward among a plurality of rewards to the player in response to the first computer game being cleared;

displaying, using a display device, a first game screen that shows a first portion of the plurality of computer games, wherein each computer game among the first portion of the plurality of computer games comprises a skip function that can omit at least a part of a plurality of game functions; and collectively executing, using the player terminal and the server, a plurality of skip functions of a second portion of the plurality of computer games among the first portion of the plurality of computer games shown in the first game screen, wherein a first plurality of stamina values required for execution is set for the plurality of computer games, wherein the plurality of skip functions of the second portion of the plurality of computer games are collectively executed so that a sum of the first plurality of stamina values of the second portion of the plurality of computer games does not exceed a stamina value that the player has, and wherein the method further comprises:
distinguishably displaying, when a part of the plurality of skip functions of the second portion of the plurality of computer games has not been executed, at least one computer game of which a skip function has been executed and at least one game of which a skip function has not been executed, among the second portion of the plurality of computer games.

8. A non-transitory computer readable medium storing a program causing a computer to execute a method comprising:

executing a first computer game among a plurality of computer games based on an operation of a player,
wherein the plurality of computer games are executed using a player terminal communicating with a server over a communication network;

assigning a first reward among a plurality of rewards to the player in response to the first computer game being cleared;

displaying, using a display device, a first game screen that shows a first portion of the plurality of computer games, wherein each computer game among the first portion of the plurality of computer games comprises a skip function that can omit at least a part of a plurality of game functions; and collectively executing, using the player terminal and the server, a plurality of skip functions of a second portion of the plurality of computer games among the first portion of the plurality of computer games shown in the first game screen, wherein a first plurality of stamina values required for execution is set for the plurality of computer games, wherein the plurality of skip functions of the second portion of the plurality of computer games are collectively executed so that a sum of the first plurality of stamina values of the second portion of the plurality of computer games does not exceed a stamina value that the player has, and wherein the method further comprises:
collectively executing, when a part of the plurality of skip functions of the second portion of the plurality of computer games has not been executed and the plurality of skip functions of the second portion of the plurality of computer games are collectively executed next time, the plurality of skip functions of the second portion of the plurality of computer games so that a sum of a second plurality of stamina values of at least one computer game of which a skip function has not been executed among the second portion of the plurality of computer games does not exceed the stamina value that the player has.

* * * * *